(12) United States Patent
Shirota et al.

(10) Patent No.: US 6,701,072 B2
(45) Date of Patent: Mar. 2, 2004

(54) THREE-LENS-UNIT ZOOM OPTICAL SYSTEM

(75) Inventors: Eiji Shirota, Hachioji (JP); Yasutaka Kashiki, Hino (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/352,213

(22) Filed: Jan. 28, 2003

(65) Prior Publication Data
US 2003/0185550 A1 Oct. 2, 2003

(30) Foreign Application Priority Data
Jan. 31, 2002 (JP) ........................ 2002-024282

(51) Int. Cl.⁷ .............. G03B 5/00; G02B 3/02; G02B 15/14
(52) U.S. Cl. .......................... 396/72; 359/689; 359/716
(58) Field of Search ............. 396/72; 359/689, 359/716, 791

(56) References Cited

U.S. PATENT DOCUMENTS

| | | | |
|---|---|---|---|
| 5,434,711 A | * 7/1995 | Tetsuya et al. | 359/689 |
| 5,587,841 A | 12/1996 | Ito | 359/689 |
| 5,687,026 A | * 11/1997 | Sato | 359/684 |
| 5,793,535 A | * 8/1998 | Ito et al. | 359/689 |
| 6,108,137 A | 8/2000 | Ohtake | 359/695 |
| 6,185,049 B1 | 2/2001 | Terada et al. | 359/689 |

FOREIGN PATENT DOCUMENTS

| | | | |
|---|---|---|---|
| JP | 05-264903 | 10/1993 | G02B/15/20 |
| JP | 11-142741 | 5/1999 | G02B/15/20 |
| JP | 11-223771 | 8/1999 | G02B/15/20 |

* cited by examiner

*Primary Examiner*—W. B. Perkey
(74) *Attorney, Agent, or Firm*—Kenyon & Kenyon

(57) ABSTRACT

A three-lens-unit zoom optical system includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the second lens unit has at least one negative lens and at least two positive lenses, and the third lens unit has, in order from the object side, a lens with at least one aspherical surface and a negative lens, satisfying the following conditions:

$$0.5 < |f3|/h < 0.8$$

$$-0.2 < f3/f1 < 0.2$$

where $f3$ is the focal length of the third lens unit, $h$ is the maximum image height, and $f31$ is the focal length of the lens with at least one aspherical surface in the third lens unit.

50 Claims, 38 Drawing Sheets

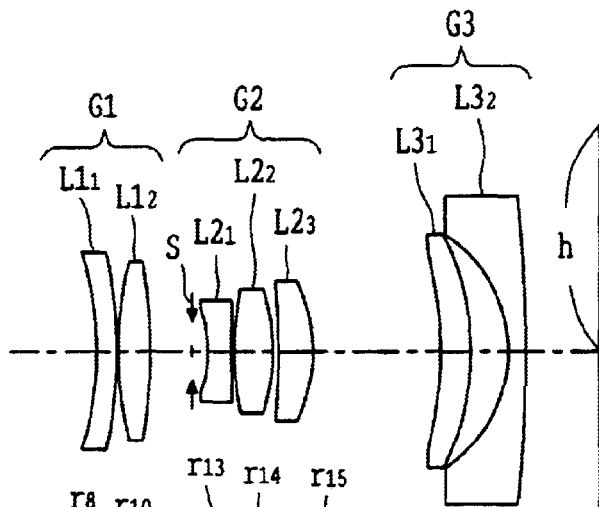
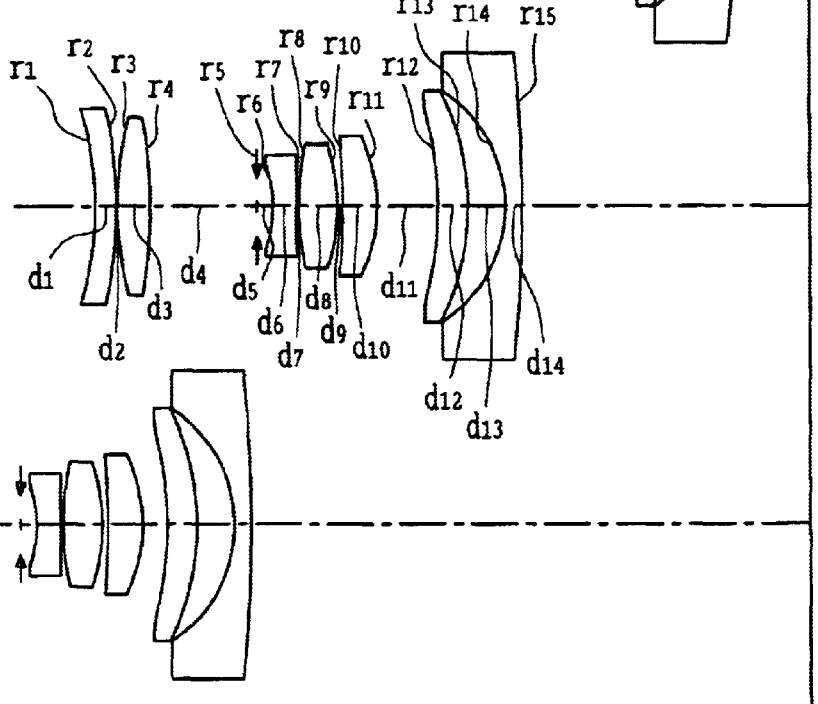
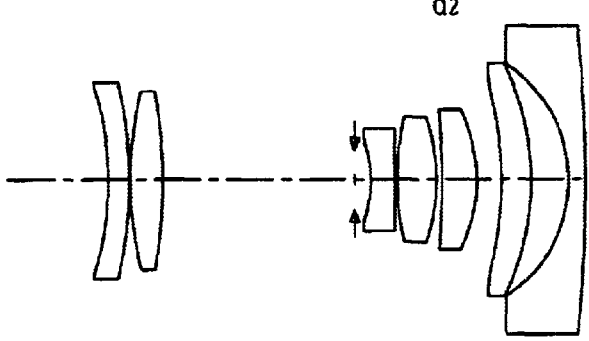
Fig.1A
Fig.1B
Fig.1C

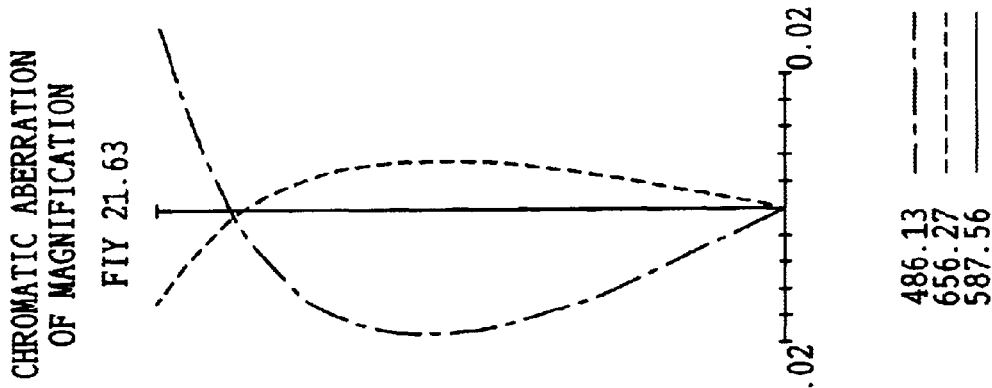
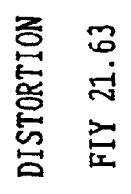

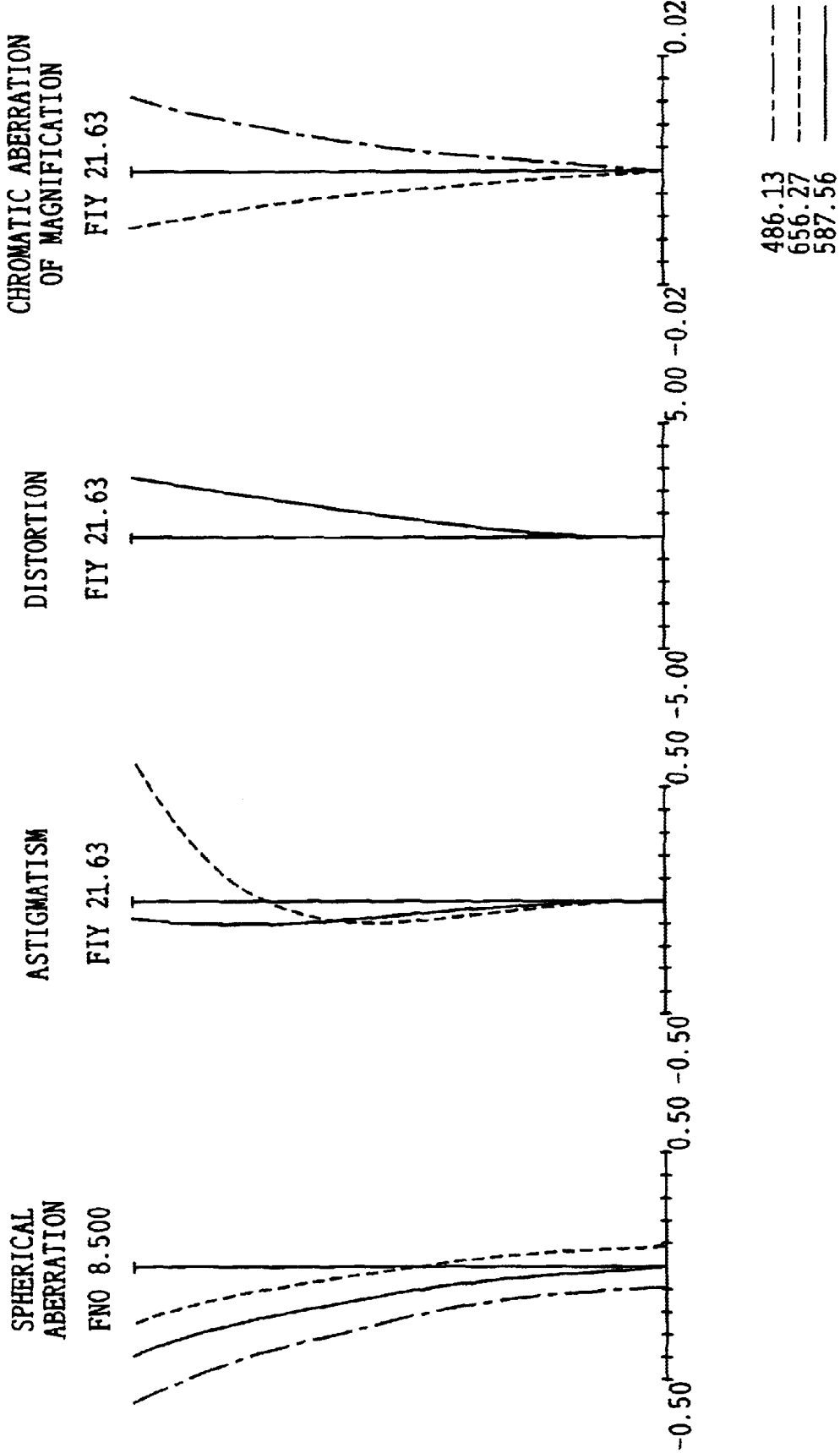

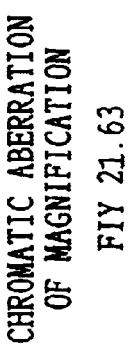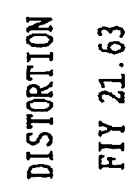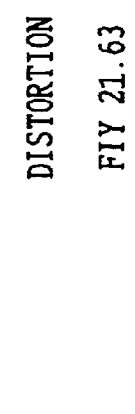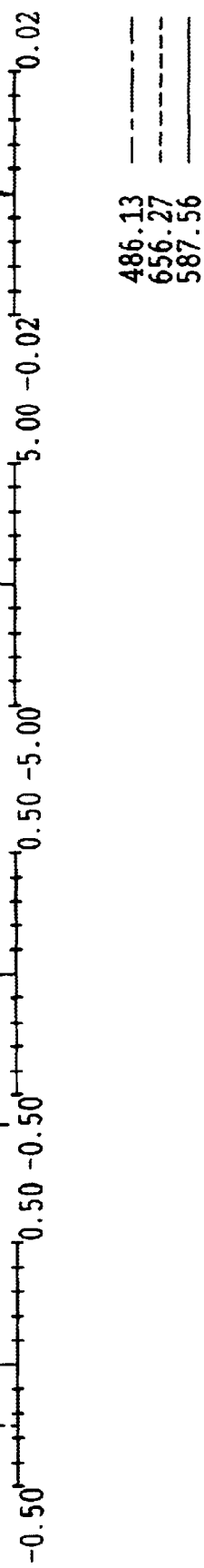

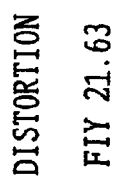
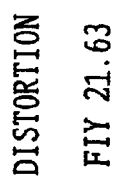
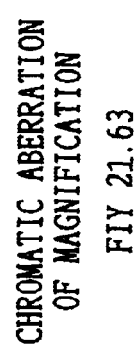

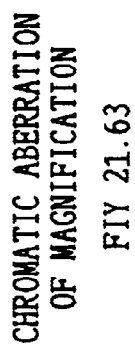
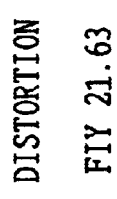
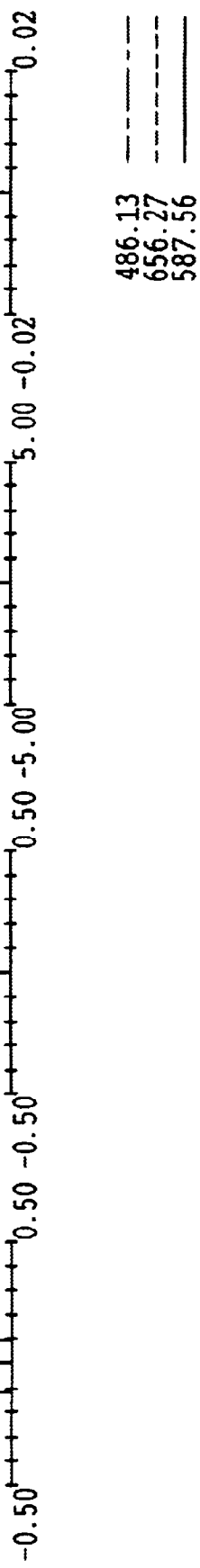

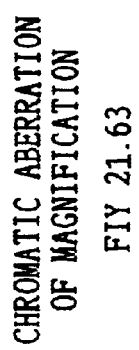
Fig.8D
CHROMATIC ABERRATION OF MAGNIFICATION
FIY 21.63
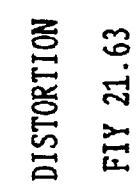
Fig.8C
DISTORTION
FIY 21.63
Fig.8B
ASTIGMATISM
FIY 21.63
Fig.8A
SPHERICAL ABERRATION
FNO 12.500
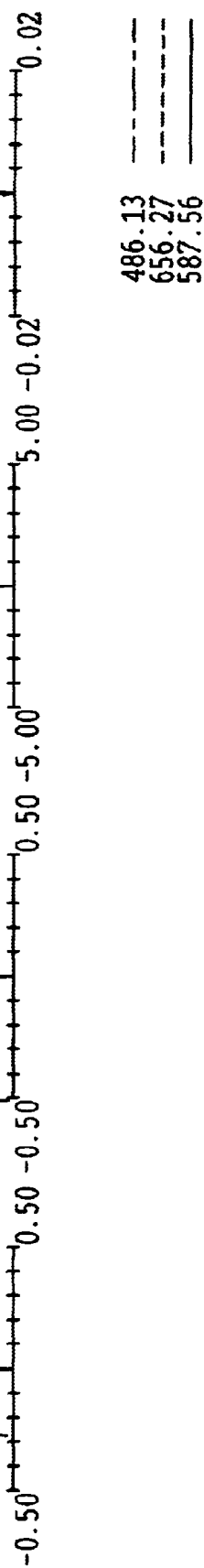
486.13
656.27
587.56

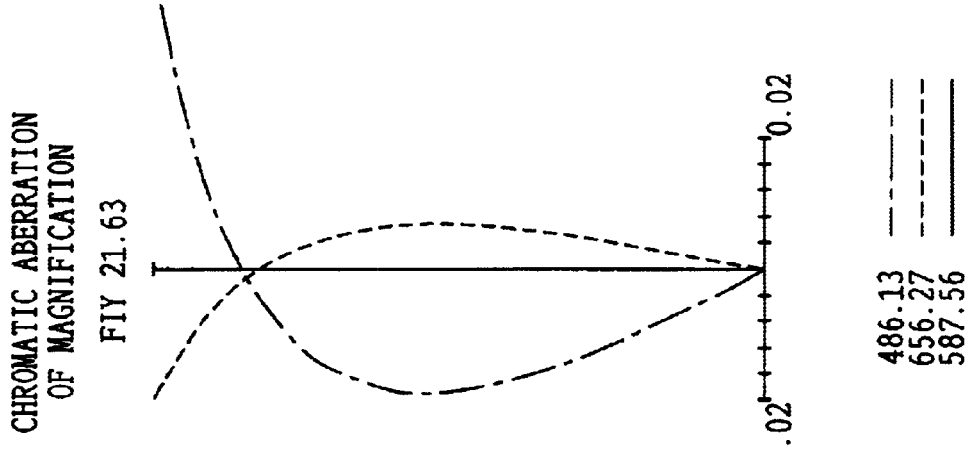
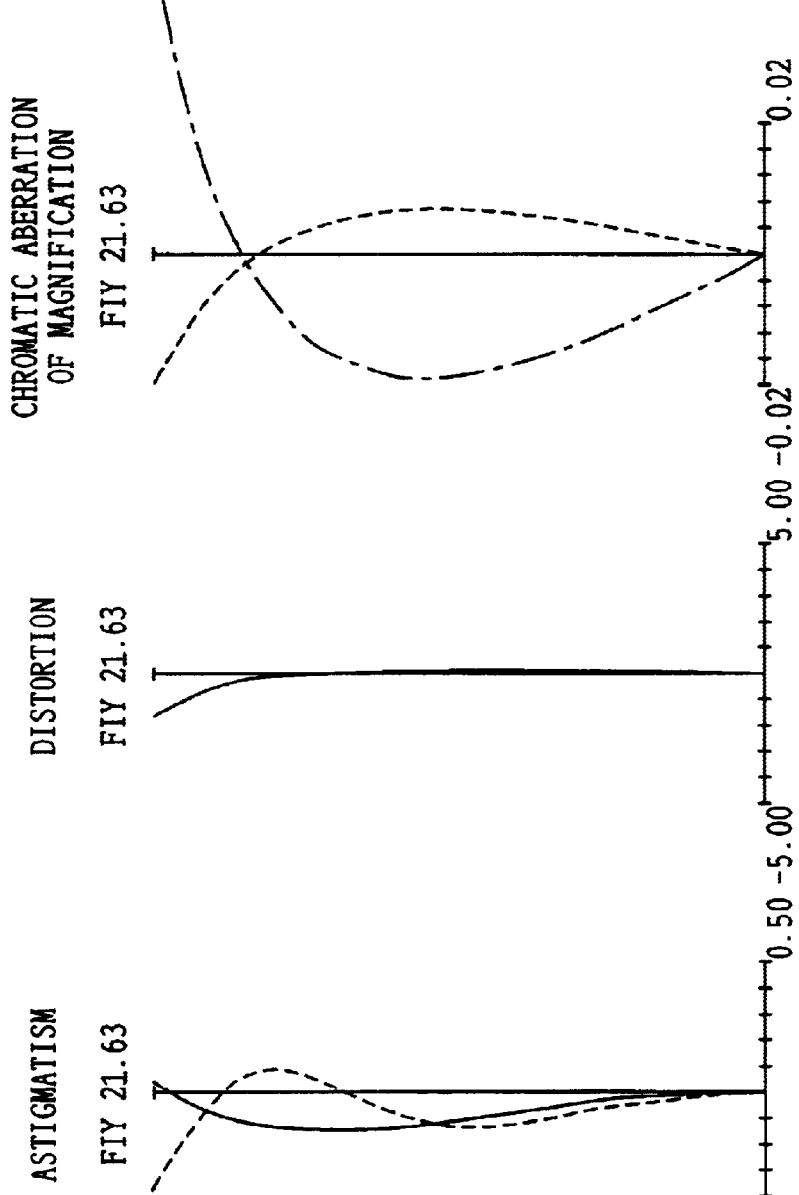
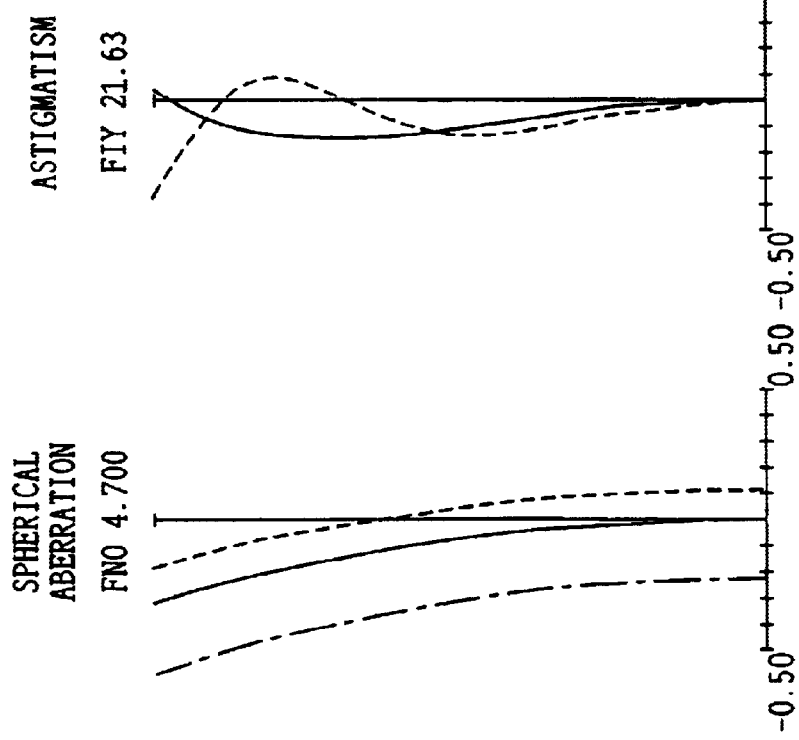

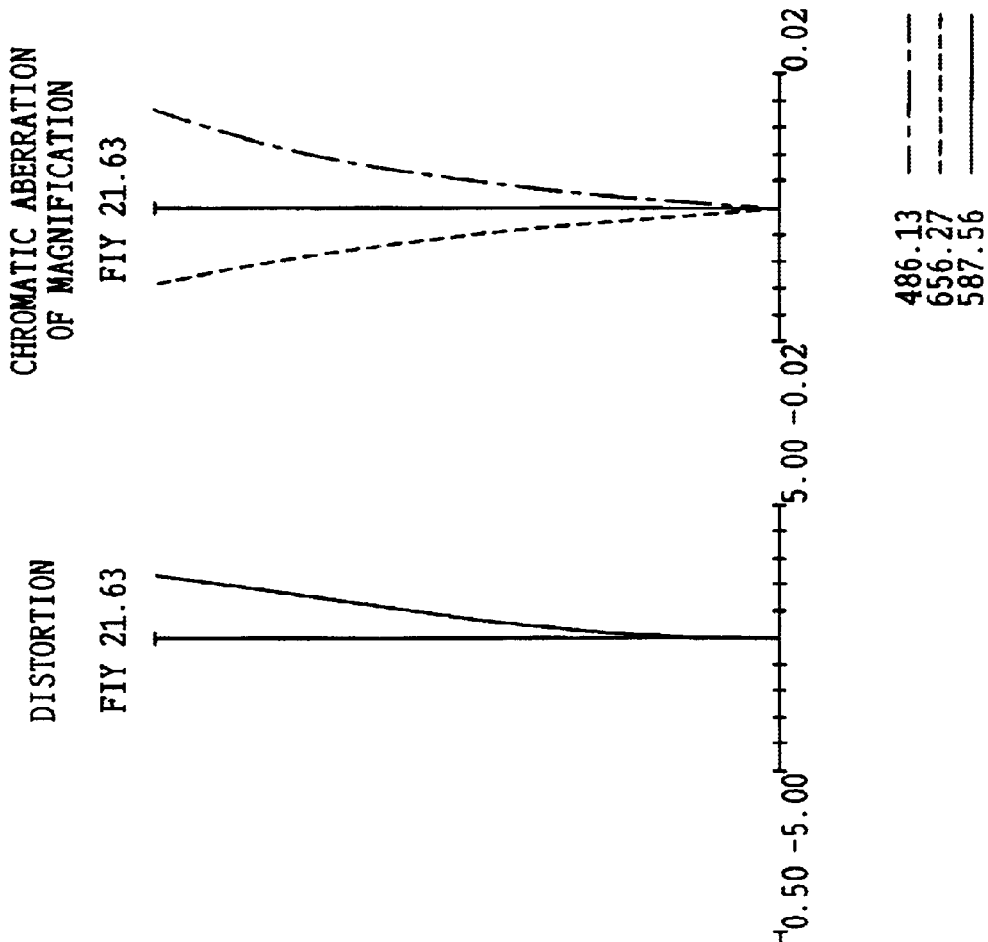
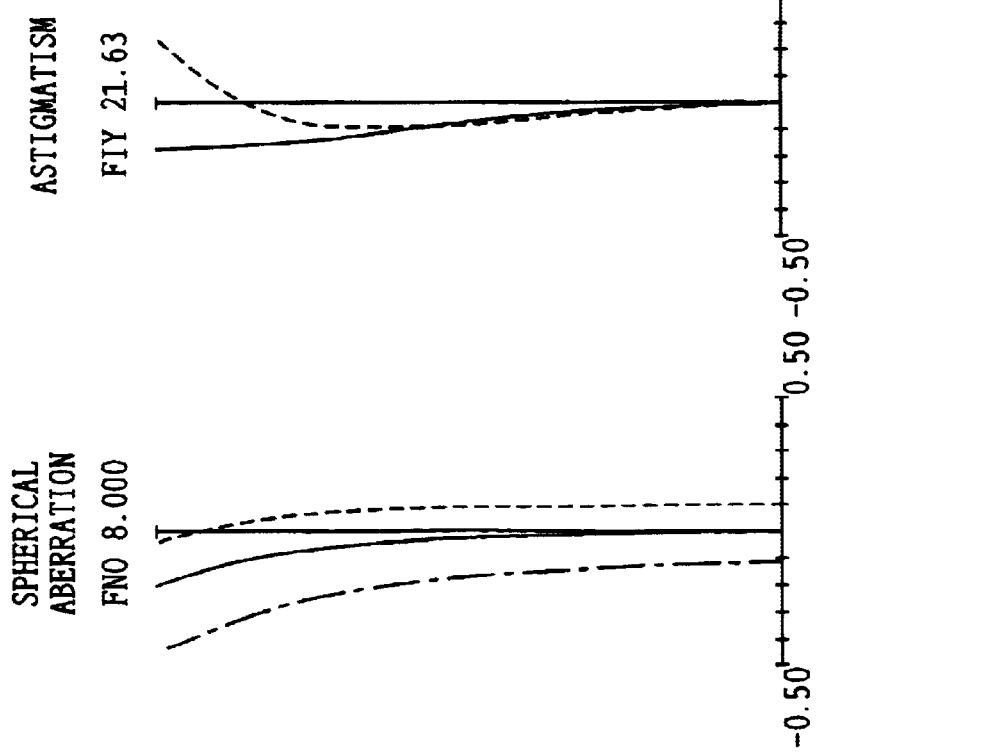

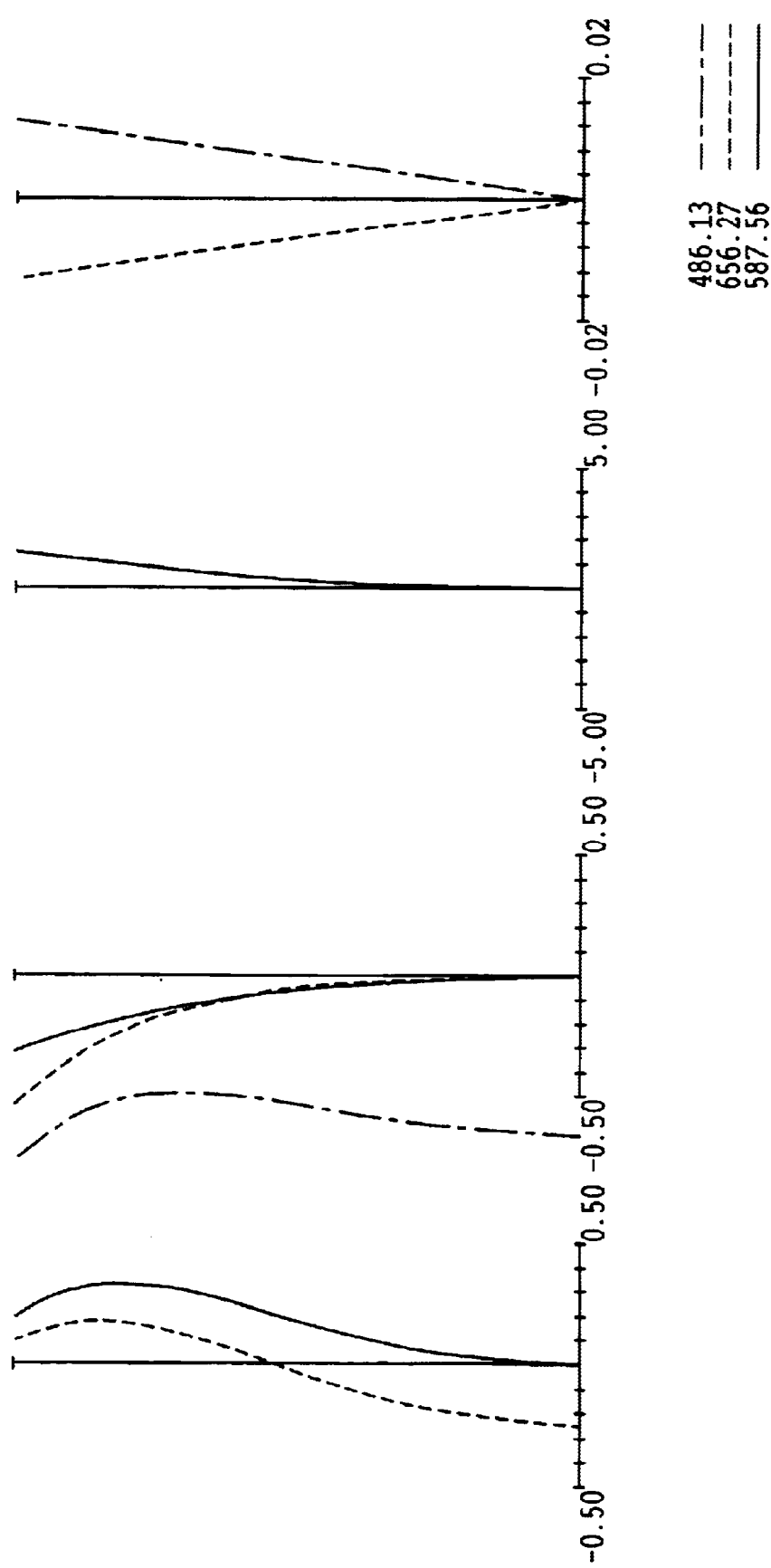

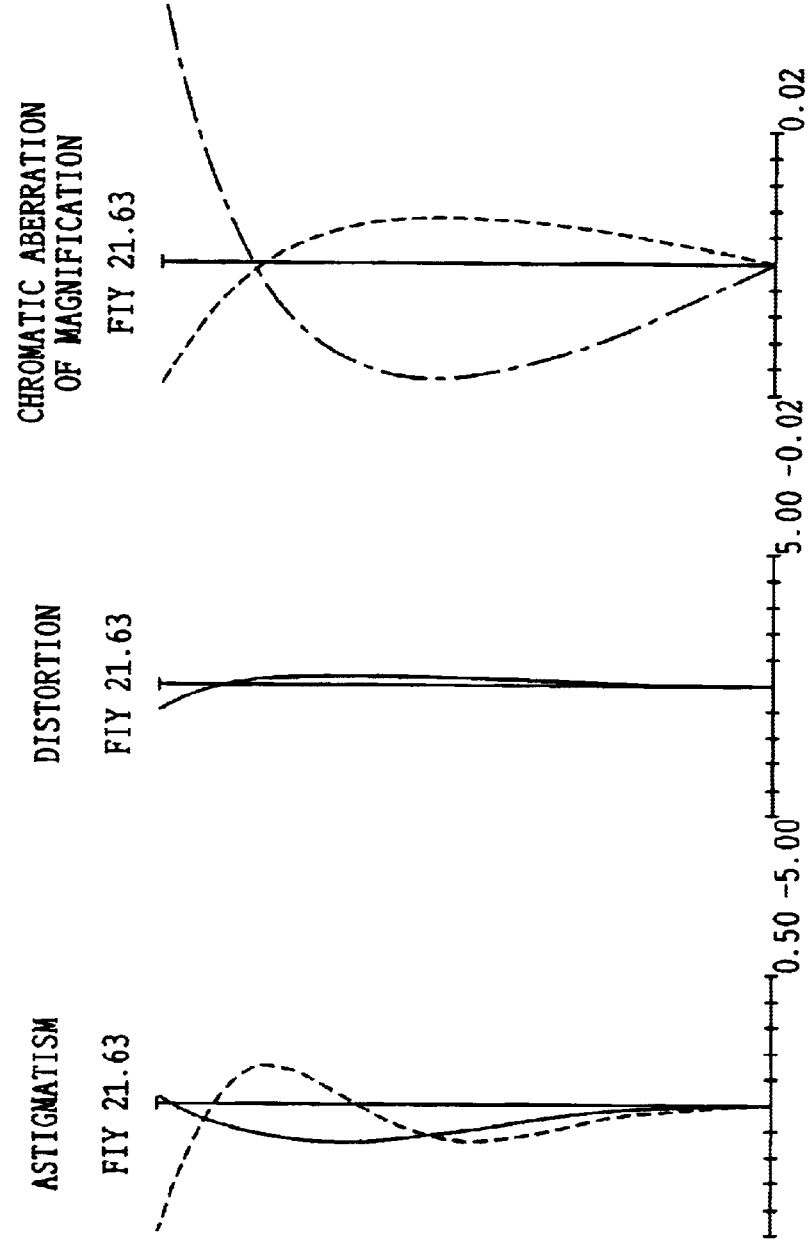

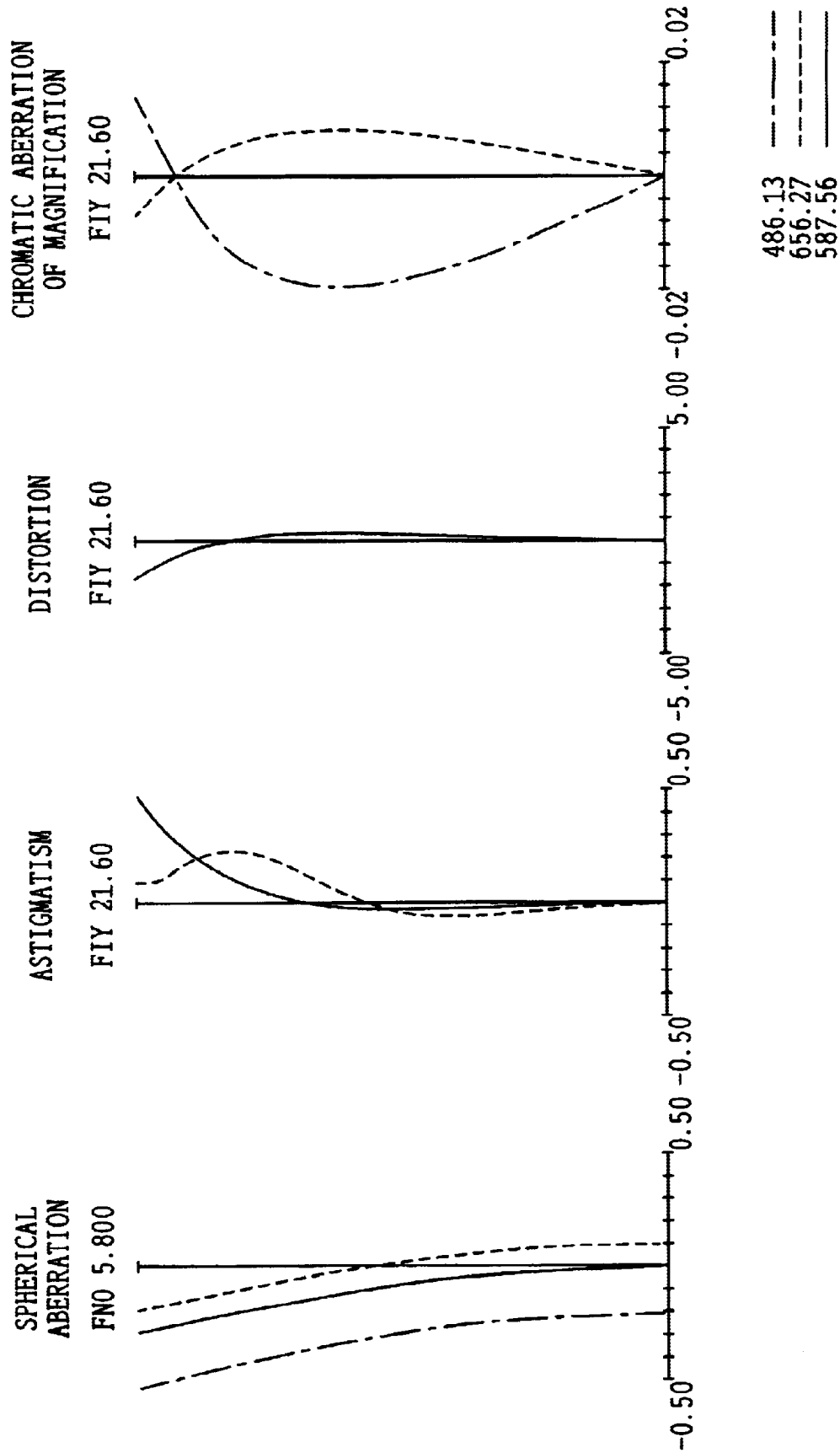

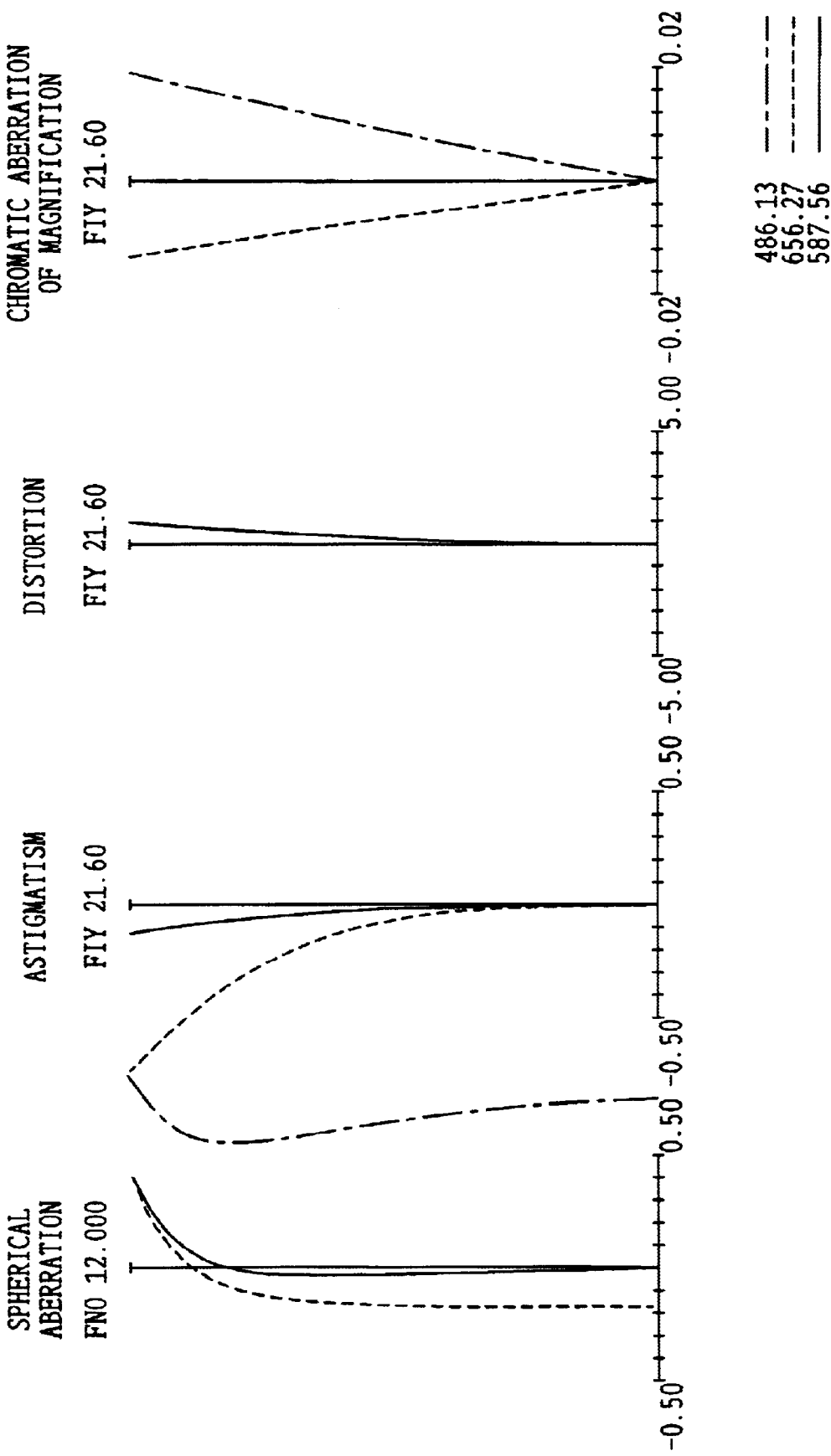

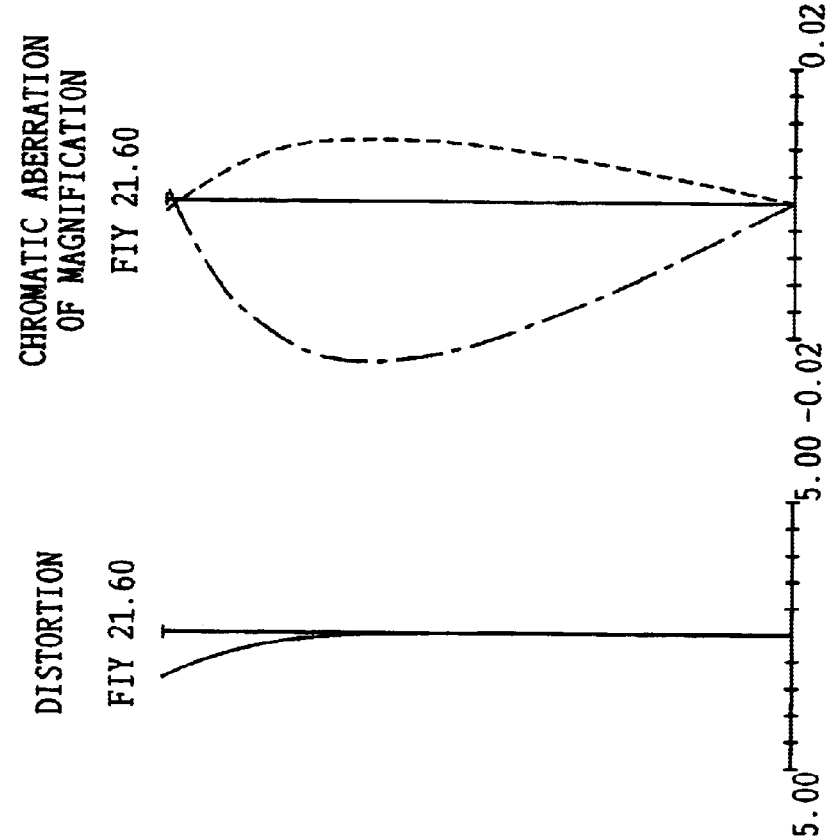
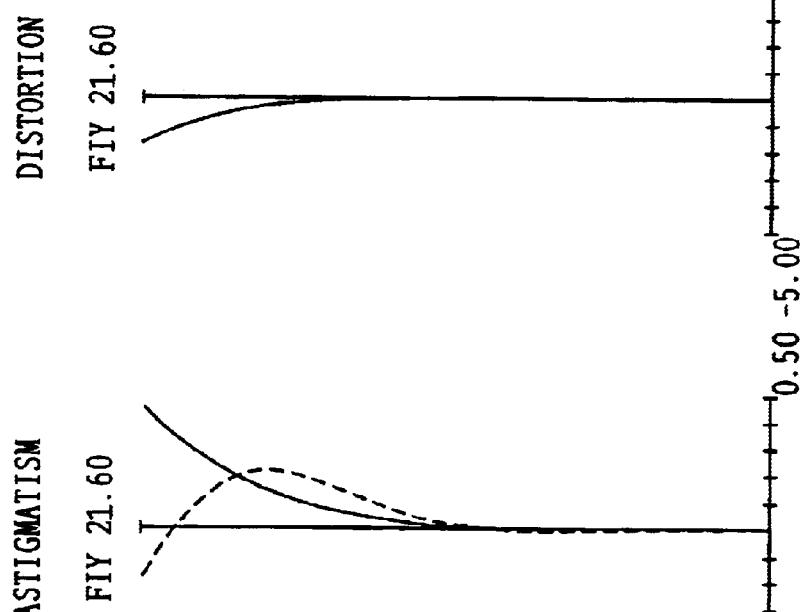
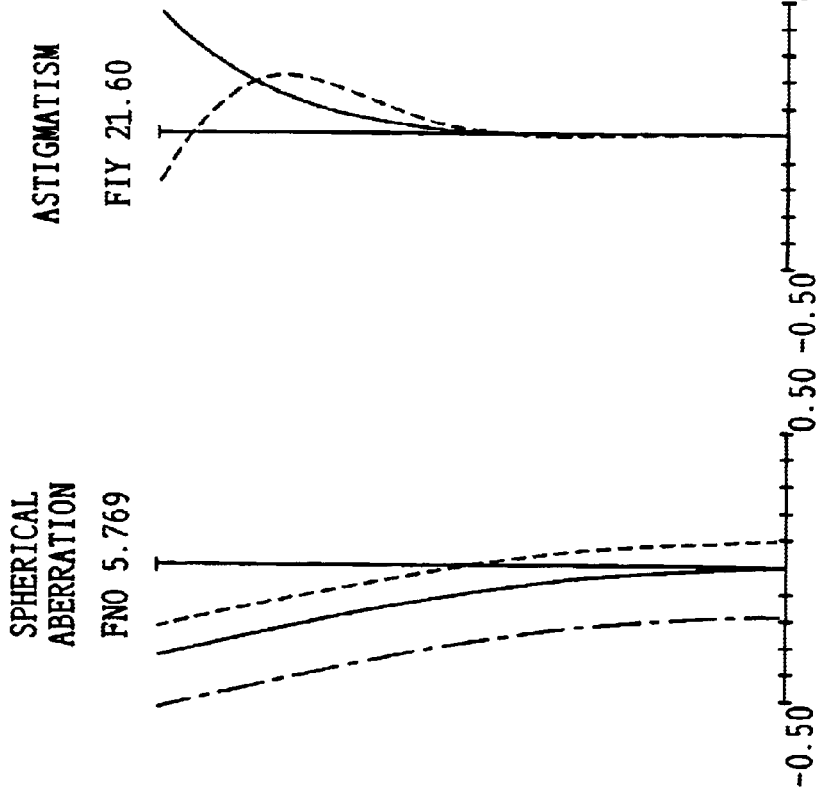

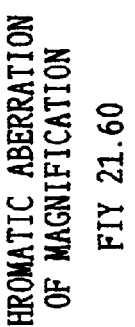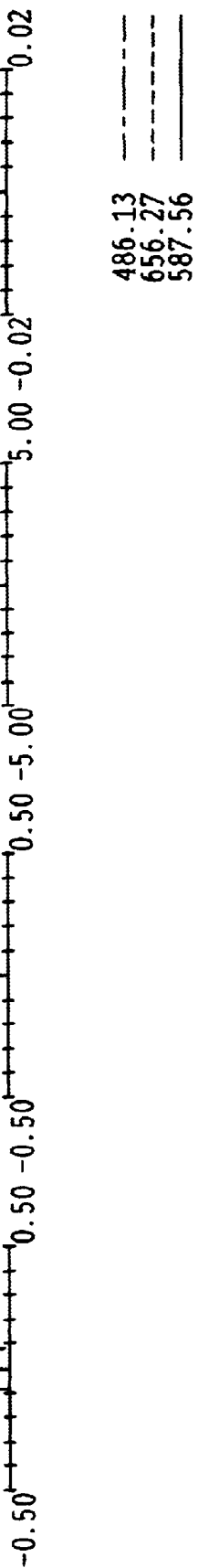

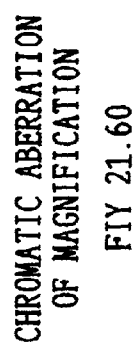

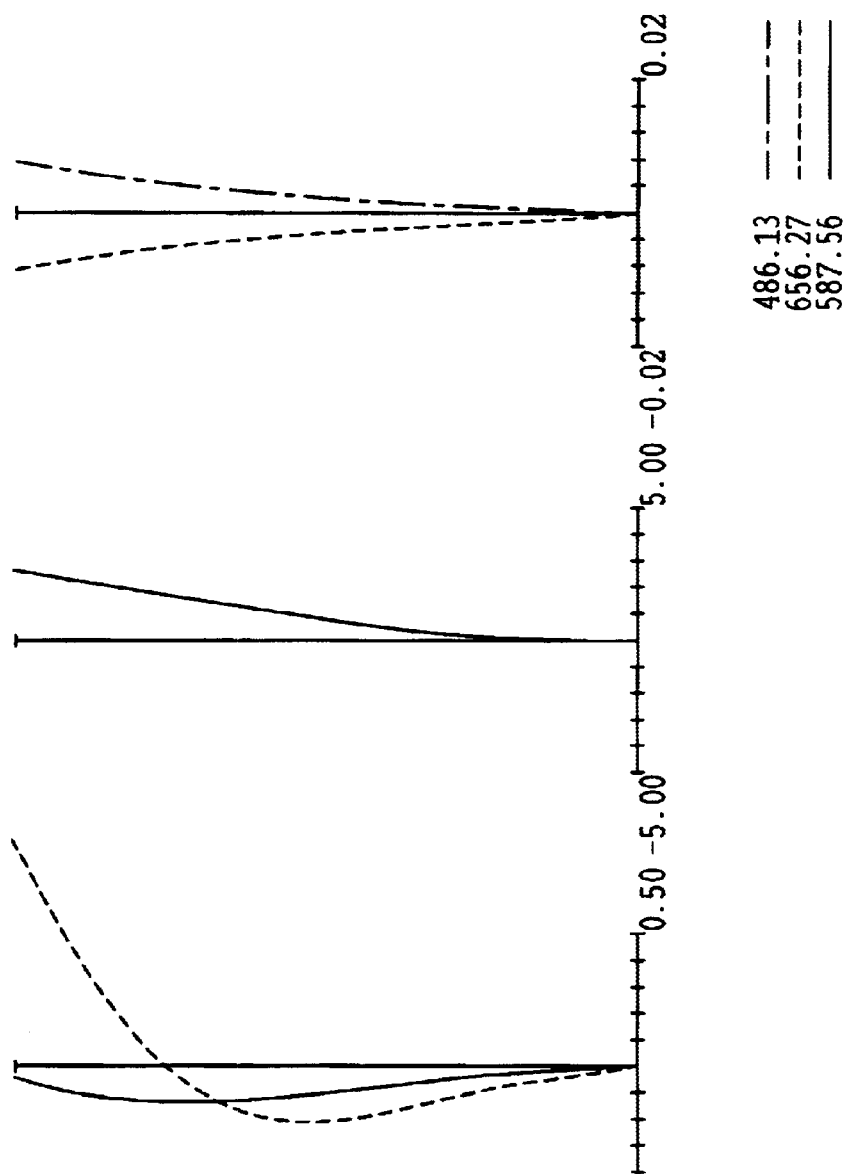

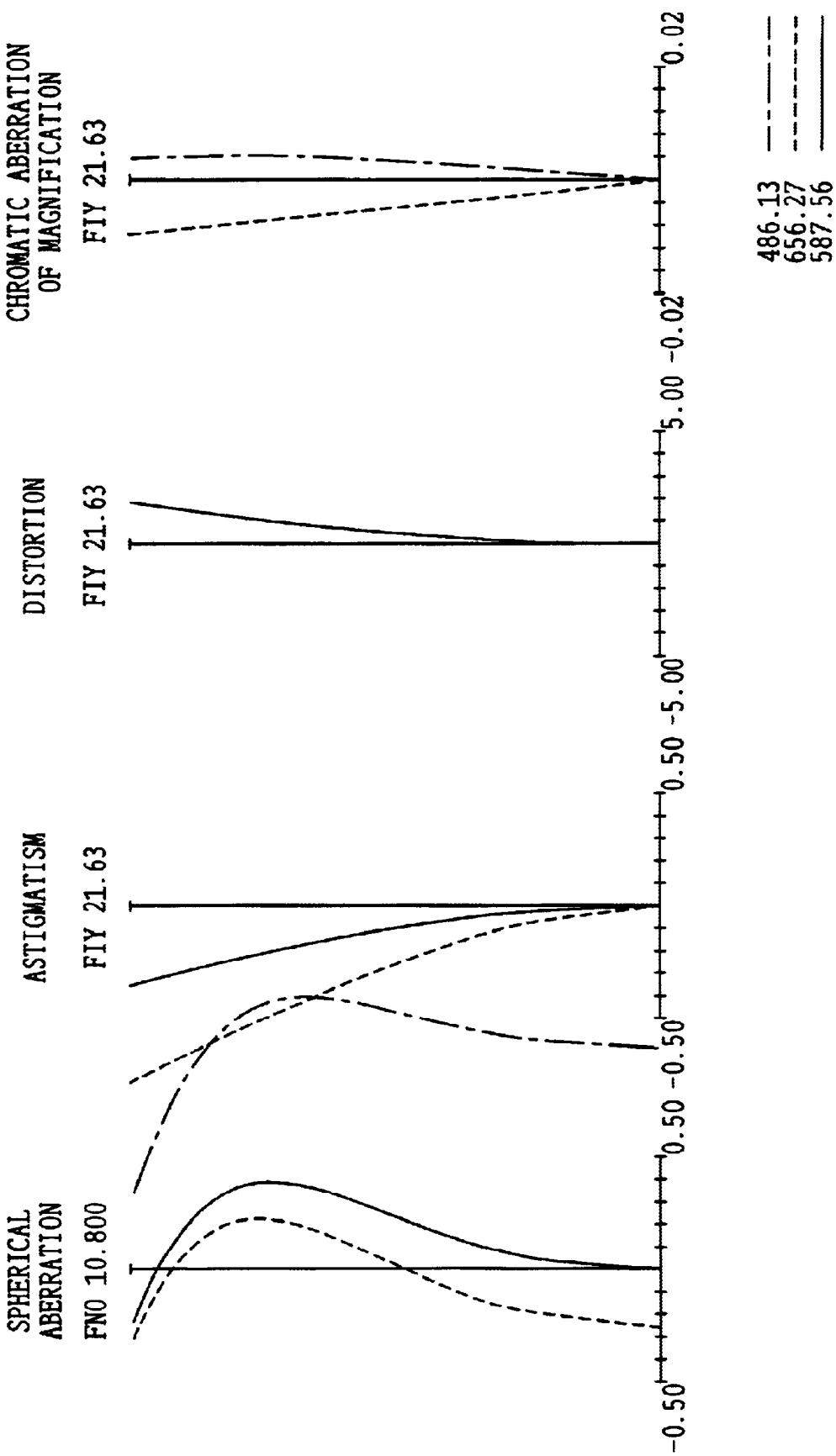

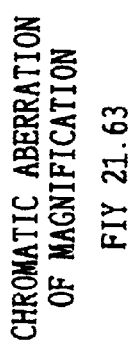

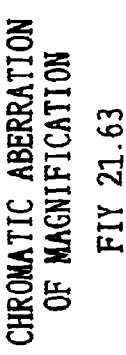
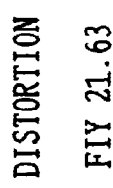

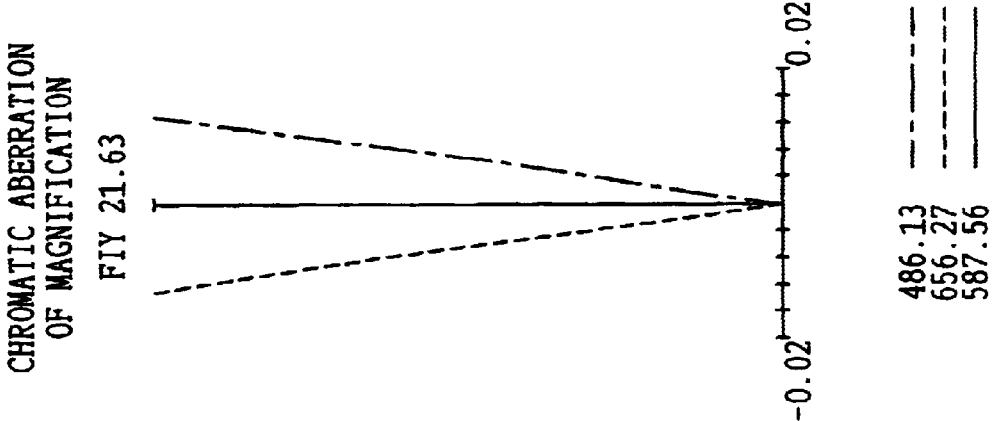

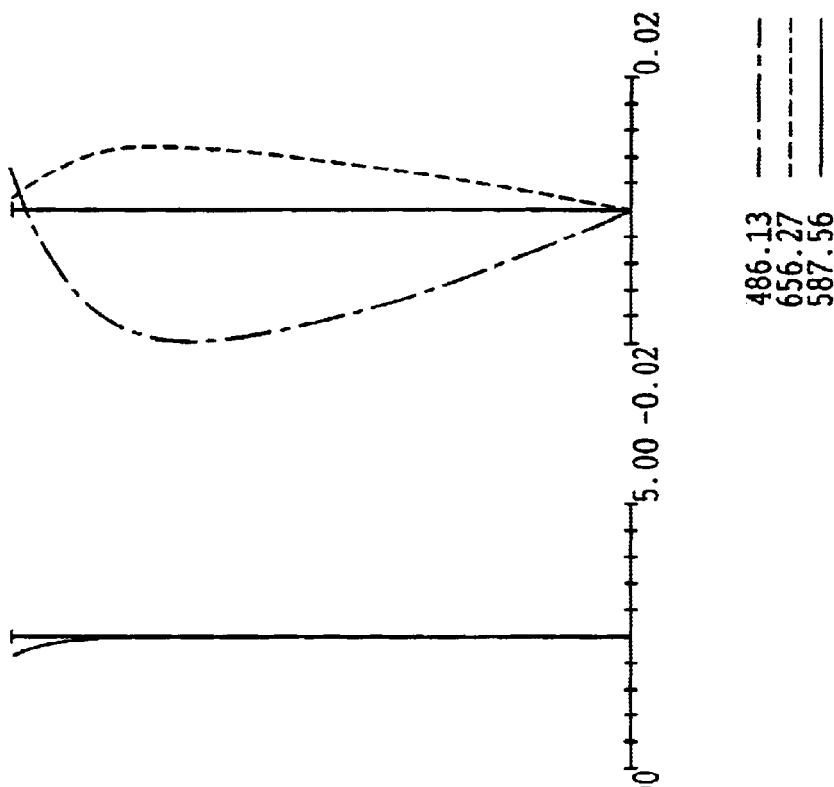
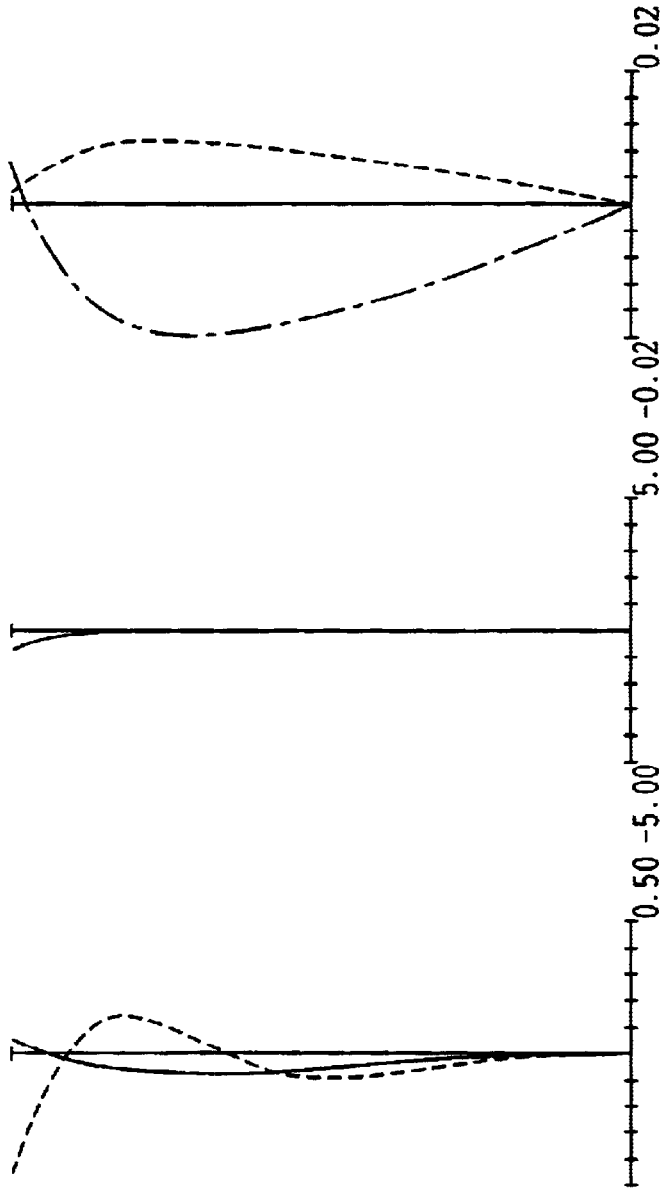
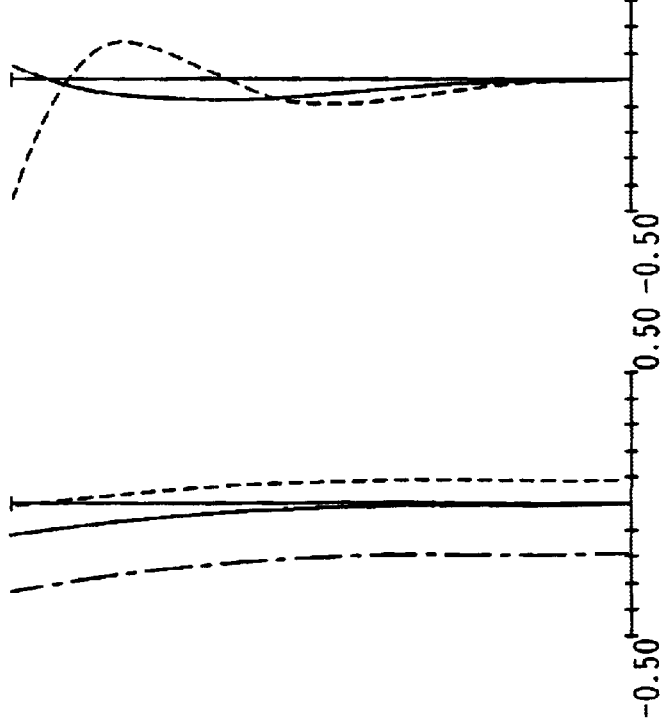
Fig.34A  Fig.34B  Fig.34C  Fig.34D

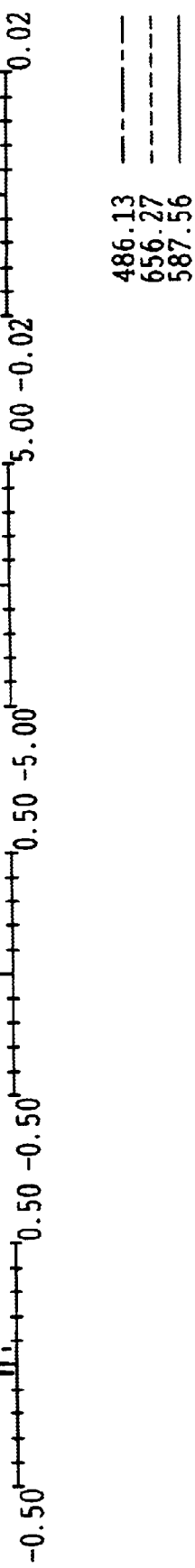

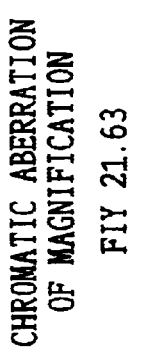
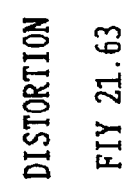
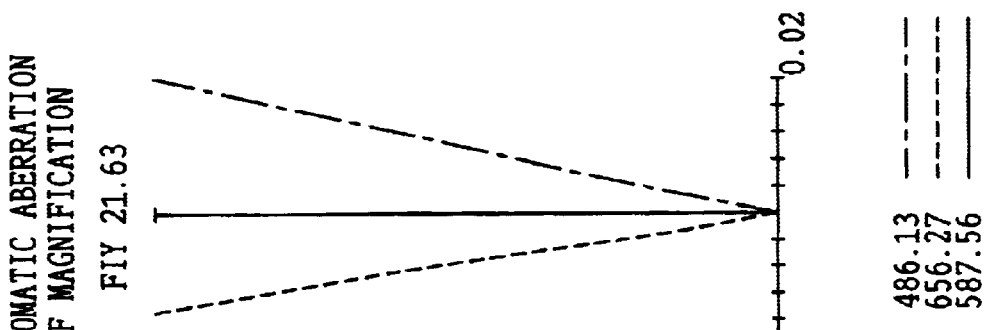

THREE-LENS-UNIT ZOOM OPTICAL SYSTEM

BACKGROUND OF THE INVENTION

1. Field of the Invention

The present invention relates to a three-lens-unit zoom optical system used in a camera for photography, and particularly in a lens shutter camera.

2. Description of Related Art

Recently, in lens shutter cameras, those provided with zoom lenses have been popularized and those mounting photographic lenses which are compact and show high variable magnification ratios have come to be required. For a variable magnification ratio of approximately 2–3, a zoom lens constructed with two lens units having positive and negative refracting powers, arranged in this order from the object side, is generally used. As for a variable magnification ratio of approximately 3–4.5, a zoom lens constructed with three lens units having positive, positive, and negative refracting powers, arranged in this order from the object side, is generally used. However, in the zoom lens constructed with the three lens units having positive, positive, and negative refracting powers in which the variable magnification ratio is above 3, the combined refracting power of a first lens unit with positive power and a second lens unit with positive power must be increased at the wide-angle position of the zoom optical system in an attempt to obtain a wide angle of a certain extent. In particular, to suppress the production of aberration in the second lens unit, an increase of the number of lenses is indispensable.

In order to obtain good performance in the entire zoom area extending from the wide-angle position to the telephoto position, it is necessary to reduce the amount of aberration in each of the zoom lens units. Since in particular the amount of aberration of a third lens unit is increased at the telephoto position, at least two lenses are required for the third lens unit.

Thus, in an attempt to achieve a wide-angle design with the three lens units constructed as mentioned above, there is the need to enlarge the number of lenses of the second and third lens units and to increase the entire lens length along the optical axis. As a result, it is difficult to reduce the entire lens length where the lens barrel of a camera is collapsed.

Conventional techniques attempting to solve such problems are disclosed in Japanese Patent Kokai Nos. Hei 11-223771, Hei 11-142741, Hei 10-307259, Hei 7-43612, Hei 5-264903, and Hei 11-295600.

In each of the techniques described in Kokai Nos. Hei 11-223771, Hei 11-142741, and Hei 10-307259, the number of lenses is lessened and compactness is achieved. However, the variable magnification ratio is less than 2 and a high variable magnification ratio is not obtained.

In each of the techniques described in Kokai Nos. Hei 7-43612 and Hei 5-264903, a variable magnification ratio of more than 3 is achieved, but compactness is not obtained because of a large number of lenses.

In the technique described in Kokai No. Hei 11-295600, aspherical surfaces are effectively used and thereby a reduction in the number of lenses and an increase in the variable magnification ratio are attained. However, the aspherical surfaces are used for both sides of the last glass lens which is largest in diameter. This makes the manufacture of the lens difficult and results in a considerable increase of cost, which is unfavorable.

SUMMARY OF THE INVENTION

It is, therefore, an object of the present invention to provide a three-lens-unit zoom optical system in which a variable magnification ratio of more than 3 is achieved and a wide-angle design and good imaging performance are obtained. In order to accomplish the above object, the three-lens-unit zoom optical system in a first aspect of the present invention includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the second lens unit has at least one negative lens and at least two positive lenses, and the third lens unit has, in order from the object side, a lens with at least one aspherical surface and a negative lens, satisfying the following conditions:

$$0.5 < |f3|/h < 0.8 \quad (1)$$

$$-0.2 < f3/f31 < 0.2 \quad (2)$$

where f3 is the focal length of the third lens unit, h is the maximum image height, and f31 is the focal length of the lens with at least one aspherical surface in the third lens unit.

The three-lens-unit zoom optical system in a second aspect of the present invention includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the third lens unit has, in order from the object side, a plastic lens with at least one aspherical surface and a negative lens, satisfying Condition (1).

The three-lens-unit zoom optical system in a third aspect of the present invention includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the second lens unit has, in order from the object side, a negative lens, a positive lens, and a positive lens, and the third lens unit has, in order from the object side, a lens with at least one aspherical surface and a negative lens, satisfying Condition (2) and the following condition:

$$1.2 < fw/h < 1.6 \quad (3)$$

where fw is a focal length at the wide-angle position.

The three-lens-unit zoom optical system in a fourth aspect of the present invention includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the third lens unit has, in order from the object side, a lens with at least one aspherical surface and a negative lens, satisfying Conditions (1) and (2) and the following condition:

$$0.3 < fw/f1 < 0.6 \quad (4)$$

where f1 is the focal length of the first lens unit.

The three-lens-unit zoom optical system in a fifth aspect of the present invention includes, in order from the object side, a first lens unit with positive refracting power, a second lens unit with positive refracting power, and a third lens unit with negative refracting power. These individual lens units are moved toward the object side so that when the magnification of the zoom optical system is changed, extending from the wide-angle position to the telephoto position, a space between the first lens unit and the second lens unit is widened and a space between the second lens unit and the third lens unit is narrowed. In this case, the third lens unit has, in order from the object side, a lens with at least one aspherical surface and a negative lens, satisfying Conditions (1) and (2) and the following condition:

$$0.3 < D_{G2}/f2 < 0.6 \quad (6)$$

where $D_{G2}$ is a distance along the optical axis from the most object-side surface of the second lens unit to the most image-side surface and f2 is the focal length of the second lens unit.

This and other objects as well as the feature and advantages of the present invention will become apparent from the following detailed description of the preferred embodiments when taken in conjunction with the accompanying drawings.

BRIEF DESCRIPTION OF THE DRAWINGS

FIGS. 1A, 1B, and 1C are sectional views showing lens arrangements, developed along the optical axis, at wide-angle, middle, and telephoto positions, respectively, in a first embodiment of the three-lens-unit zoom optical system according to the present invention;

FIGS. 2A, 2B, 2C, and 2D are diagrams showing aberration characteristics at the wide-angle position in the first embodiment;

FIGS. 3A, 3B, 3C, and 3D are diagrams showing aberration characteristics at the middle position in the first embodiment;

FIGS. 4A, 4B, 4C, and 4D are diagrams showing aberration characteristics at the telephoto position in the first embodiment;

FIGS. 6A, 6B, 6C, and 6D are diagrams showing aberration characteristics at the wide-angle position in the second embodiment;

FIGS. 7A, 7B, 7C, and 7D are diagrams showing aberration characteristics at the middle position in the second embodiment;

FIGS. 8A, 8B, 8C, and 8D are diagrams showing aberration characteristics at the telephoto position in the second embodiment;

FIGS. 10A, 10B, 10C, and 10D are diagrams showing aberration characteristics at the wide-angle position in the third embodiment;

FIGS. 11A, 11B, 11C, and 11D are diagrams showing aberration characteristics at the middle position in the third embodiment;

FIGS. 12A, 12B, 12C, and 12D are diagrams showing aberration characteristics at the telephoto position in the third embodiment;

FIGS. 14A, 14B, 14C, and 14D are diagrams showing aberration characteristics at the wide-angle position in the fourth embodiment;

FIGS. 18A, 18B, 18C, and 18D are diagrams showing aberration characteristics at the wide-angle position in the fifth embodiment;

FIGS. 20A, 20B, 20C, and 20D are diagrams showing aberration characteristics at the telephoto position in the fifth embodiment;

FIGS. 22A, 22B, 22C, and 22D are diagrams showing aberration characteristics at the wide-angle position in the sixth embodiment;

FIGS. 23A, 23B, 23C, and 23D are diagrams showing aberration characteristics at the middle position in the sixth embodiment;

FIGS. 24A, 24B, 24C, and 24D are diagrams showing aberration characteristics at the telephoto position in the sixth embodiment;

FIGS. 27A, 27B, 27C, and 27D are diagrams showing aberration characteristics at the middle position in the seventh the embodiment;

FIGS. 28A, 28B, 28C, and 28D are diagrams showing aberration characteristics at the telephoto position in the seventh embodiment;

FIGS. 30A, 30B, 30C, and 30D are diagrams showing aberration characteristics at the wide-angle position in the eighth embodiment;

FIGS. 31A, 31B, 31C, and 31D are diagrams showing aberration characteristics at the middle position in the eighth embodiment;

FIGS. 32A, 32B, 32C, and 32D are diagrams showing aberration characteristics at the telephoto position in the eighth embodiment;

FIGS. 34A, 34B, 34C, and 34D are diagrams showing aberration characteristics at the wide-angle position in the ninth embodiment;

FIGS. 35A, 35B, 35C, and 35D are diagrams showing aberration characteristics at the middle position in the ninth embodiment;

FIGS. 36A, 36B, 36C, and 36D are diagrams showing aberration characteristics at the telephoto position in the ninth embodiment;

DETAILED DESCRIPTION OF THE PREFERRED EMBODIMENTS

Figure 5A:
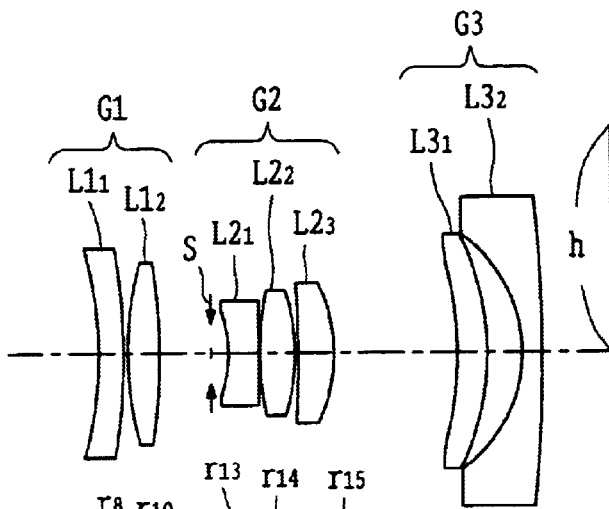
FIGS. 5A, 5B, and 5C are sectional views showing lens arrangements, developed along the optical axis, at wide-angle, middle, and telephoto positions, respectively, in a second embodiment of the three-lens-unit zoom optical system according to the present invention.

Before the description of the embodiments, the function and effect of the present invention will be explained.

The three-lens-unit zoom optical system in the first aspect of the present invention includes, in order from the object side, the first lens unit with positive refracting power, the second lens unit with positive refracting power, and the third lens unit with negative refracting power. In its zoom system, when the magnification of the zoom optical system is changed, extending from the wide-angle position to the telephoto position, these lens units are moved toward the object side so that the space between the first lens unit and the second lens unit is widened and the space between the second lens unit and the third lens unit is narrowed.

The second lens unit is constructed with at least one negative lens and at least two positive lenses.

In view of a reduction in the entire length, it is desirable that the second lens unit is constructed with two lenses of negative and positive powers. However, when the second lens unit is constructed with the two lenses, the power of each of the lenses is strengthened and the amount of aberration produced in each lens is increased. Consequently, residual aberration in the second lens unit is increased. This is unfavorable for performance because when zoom is performed at a high variable magnification ratio, the fluctuation of aberration at each position becomes pronounced.

Thus, when another positive lens is added to the second lens unit, as in the present invention, a load imposed on the existing positive lens is lessened and aberration can be favorably corrected.

Also, although a further addition of lenses allows aberration to be corrected more favorably, the entire lens length where the lens barrel of a camera is collapsed is unfavorably increased. Thus, in the present invention, the second lens unit is constructed with three lenses.

The third lens unit has a lens with at least one aspherical surface and a negative lens.

In order to achieve a reduction of the overall length, it is necessary to strengthen the power of the third lens unit. In view of compactness where the lens barrel is collapsed, it is desirable that the third lens unit is constructed with a single lens. However, with the single lens, aberration in the third lens unit cannot be eliminated, and the fluctuation of aberration becomes heavy during zooming.

Thus, as in the present invention, another lens is placed in front of the negative lens to constitute the third lens unit. If, however, the power of this additional lens is strong and a space between the additional lens and the negative lens is shifted, the sensitivity of a change in focusing to the shift of the space becomes high. Consequently, it becomes difficult to fabricate the third lens unit, which is unfavorable.

If the power is merely weakened to provide less sensitivity, little effect will be produced on correction for aberration. Thus, at least one surface of the lens is configured as an aspherical surface so that even though the power is weak, aberration in the third lens unit can be corrected.

The three-lens-unit zoom optical system in the second aspect of the present invention includes, in order from the object side, the first lens unit with positive refracting power, the second lens unit with positive refracting power, and the third lens unit with negative refracting power. In its zoom system, when the magnification of the zoom optical system is changed, extending from the wide-angle position to the telephoto position, these lens units are moved toward the object side so that the space between the first lens unit and the second lens unit is widened and the space between the second lens unit and the third lens unit is narrowed.

The third lens unit is constructed with a lens of at least one aspherical surface and a negative lens.

In order to achieve a reduction of the overall length, it is necessary to strengthen the power of the third lens unit. In view of compactness where the lens barrel is collapsed, it is desirable that the third lens unit is constructed with a single lens. However, with the single lens, aberration in the third lens unit cannot be eliminated, and the fluctuation of aberration becomes heavy during zooming.

Thus, as in the present invention, another lens is placed in front of the negative lens to constitute the third lens unit. If, however, the power of this additional lens is strong and a space between the additional lens and the negative lens is shifted, the sensitivity of a change in focusing to the shift of the space becomes high. Consequently, it becomes difficult to fabricate the third lens unit, which is unfavorable.

If the power is merely weakened to provide less sensitivity, little effect will be produced on correction for aberration. Thus, at least one surface of the lens is configured as an aspherical surface so that even though the power is weak, aberration in the third lens unit can be corrected.

In the third lens unit, the height of an off-axis ray passing through the lenses is considerable, and thus the outside diameter of each lens must be enlarged. A glass lens such as to have the aspherical surface in addition to the large outside diameter offers a significant cost disadvantage.

Thus, as in the present invention, when a plastic lens with at least one aspherical surface is used to constitute the above lens, cost can be reduced and the aspherical surface can be easily configured, in contrast with the case of the glass lens. Furthermore, its specific gravity is low, thus resulting in lightweight design of the product. The plastic lens is liable to bring about a change of focusing by temperature or humidity. However, when the power of the plastic lens is weakened as in the present invention, the change of focusing by temperature or humidity can be kept to a minimum, which is favorable.

The three-lens-unit zoom optical system in the third aspect of the present invention includes, in order from the object side, the first lens unit with positive refracting power, the second lens unit with positive refracting power, and the third lens unit with negative refracting power. In its zoom system, when the magnification of the zoom optical system is changed, extending from the wide-angle position to the telephoto position, these lens units are moved toward the object side so that the space between the first lens unit and the second lens unit is widened and the space between the second lens unit and the third lens unit is narrowed.

It is desirable that the second lens unit includes, in order from the object side, a negative lens directing a concave surface toward the object side, a positive lens, and a positive lens.

When the field angle of the zoom optical system at the wide-angle position is above 70°, the space between the second lens unit and the third lens unit is widened at the wide-angle position. As such, the back focal distance of the zoom optical system tends to shorten.

Thus, in the second lens unit, the object-side surface of the most object-side lens is configured to be concave. By doing so, the principal point is located on the image side, and hence the back focal distance can be ensured. When a stop is placed, a concave surface with strong power is provided on the object side, immediately behind the stop. Whereby, the effect of eliminating strong negative, spherical aberration yielded in the second lens unit at the telephoto position is brought about.

In the second lens unit, two positive lenses are arranged behind the negative lens. One of these positive lenses is preferably configured as a biconvex lens so that the production of aberration is principally suppressed. The other lens is preferably configured to direct a concave surface toward the object side in order to suppress aberration produced with respect to the off-axis ray, notably the production of coma. It is thus good practice to correct aberration in the second lens unit through such three lenses.

The third lens unit is constructed with a lens of at least one aspherical surface and a negative lens.

In order to achieve a reduction of the overall length, it is necessary to strengthen the power of the third lens unit. In view of compactness where the lens barrel is collapsed, it is desirable that the third lens unit is constructed with a single lens. However, with the single lens, aberration in the third lens unit cannot be eliminated, and the fluctuation of aberration becomes heavy during zooming.

Thus, as in the present invention, another lens is placed in front of the negative lens to constitute the third lens unit. If, however, the power of this additional lens is strong and a space between the additional lens and the negative lens is shifted, the sensitivity of a change in focusing to the shift of the space becomes high. Consequently, it becomes difficult to fabricate the third lens unit, which is unfavorable.

If the power is merely weakened to provide less sensitivity, little effect will be produced on correction for aberration. Thus, at least one surface of the lens is configured as an aspherical surface so that even though the power is weak, aberration in the third lens unit can be corrected.

The three-lens-unit zoom optical system in the fourth aspect of the present invention includes, in order from the object side, the first lens unit with positive refracting power, the second lens unit with positive refracting power, and the third lens unit with negative refracting power. In its zoom system, when the magnification of the zoom optical system is changed, extending from the wide-angle position to the telephoto position, these lens units are moved toward the object side so that the space between the first lens unit and the second lens unit is widened and the space between the second lens unit and the third lens unit is narrowed.

The third lens unit is constructed with a lens of at least one aspherical surface and a negative lens.

In order to achieve a reduction of the overall length, it is necessary to strengthen the power of the third lens unit. In view of compactness where the lens barrel is collapsed, it is desirable that the third lens unit is constructed with a single lens. However, with the single lens, aberration in the third lens unit cannot be eliminated, and the fluctuation of aberration in zoom is increased.

Thus, as in the present invention, another lens is placed in front of the negative lens to constitute the third lens unit. If, however, the power of this additional lens is strong and a space between the additional lens and the negative lens is shifted, the sensitivity of a change in focusing to the shift of the space becomes high. Consequently, it becomes difficult to fabricate the third lens unit, which is unfavorable.

If the power is merely weakened to provide less sensitivity, little effect will be produced on correction for aberration. Thus, at least one surface of the lens is configured as an aspherical surface so that even though the power is weak, aberration in the third lens unit can be corrected.

It is desirable that the three-lens-unit zoom optical system in the fourth aspect of the present invention satisfies Conditions (1), (2), and (4).

The three-lens-unit zoom optical system in the fifth aspect of the present invention includes, in order from the object side, the first lens unit with positive refracting power, the second lens unit with positive refracting power, and the third lens unit with negative refracting power. In its zoom system, when the magnification of the zoom optical system is changed, extending from the wide-angle position to the telephoto position, these lens units are moved toward the object side so that the space between the first lens unit and the second lens unit is widened and the space between the second lens unit and the third lens unit is narrowed.

The third lens unit is constructed with a lens of at least one aspherical surface and a negative lens.

In order to achieve a reduction of the overall length, it is necessary to strengthen the power of the third lens unit. In view of compactness where the lens barrel is collapsed, it is desirable that the third lens unit is constructed with a single lens. However, with the single lens, aberration in the third lens unit cannot be eliminated, and the fluctuation of aberration becomes heavy during zooming.

Thus, as in the present invention, another lens is placed in front of the negative lens to constitute the third lens unit. If, however, the power of this additional lens is strong and a space between the additional lens and the negative lens is shifted, the sensitivity of a change in focusing to the shift of the space becomes high. Consequently, it becomes difficult to fabricate the third lens unit, which is unfavorable.

If the power is merely weakened to provide less sensitivity, little effect will be produced on correction for aberration. Thus, at least one surface of the lens is configured as an aspherical surface so that even though the power is weak, aberration in the third lens unit can be corrected.

It is desirable that the three-lens-unit zoom optical system in the fifth aspect of the present invention satisfies Conditions (1), (2), and (6).

In the first aspect of the present invention, it is favorable to satisfy Condition (3).

In the first aspect of the present invention, the lens with at least one aspherical surface in the third lens unit is preferably constructed of plastic.

In the first aspect of the present invention, it is desirable that the second lens unit has, in order from the object side, a negative lens, a positive lens, and a positive lens.

In the first aspect of the present invention, it is desirable to satisfy Condition (4).

In the first aspect of the present invention, a negative lens directing a concave surface toward the object side is preferably located at the most object-side position of the second lens unit to satisfy the following condition:

$$0.4 < r_{211}/f2 < 0.8 \tag{5}$$

where $r_{211}$ is the radius of curvature of the object-side surface of the negative lens located at the most object-side position in the second lens unit.

In the first aspect of the present invention, it is desirable to satisfy Condition (6).

In the first aspect of the present invention, a negative meniscus lens directing a concave surface toward the object side, of lenses constituting the first lens unit, is preferably placed at the most object-side position of the first lens unit.

In the second aspect of the present invention, it is desirable to satisfy Condition (3).

In the second aspect of the present invention, it is desirable that the second lens unit has, in order from the object side, a negative lens, a positive lens, and a positive lens.

In the second aspect of the present invention, it is desirable to satisfy Condition (4).

In the second aspect of the present invention, a negative lens directing a concave surface toward the object side is preferably located at the most object-side position of the second lens unit to satisfy Condition (5).

In the second aspect of the present invention, it is desirable to satisfy Condition (6).

In the second aspect of the present invention, a negative meniscus lens directing a concave surface toward the object side, of lenses constituting the first lens unit, is preferably placed at the most object-side position of the first lens unit.

In the third aspect of the present invention, the lens with at least one aspherical surface in the third lens unit is preferably constructed of plastic.

In the third aspect of the present invention, it is desirable to satisfy Condition (1).

In the third aspect of the present invention, it is desirable to satisfy Condition (4).

In the third aspect of the present invention, a negative lens directing a concave surface toward the object side is preferably located at the most object-side position of the second lens unit to satisfy Condition (5).

In the third aspect of the present invention, it is desirable to satisfy Condition (6).

In the third aspect of the present invention, a negative meniscus lens directing a concave surface toward the object side, of lenses constituting the first lens unit, is preferably placed at the most object-side position of the first lens unit.

In the fourth aspect of the present invention, it is desirable to satisfy Condition (3).

In the fourth aspect of the present invention, the lens with at least one aspherical surface in the third lens unit is preferably constructed of plastic.

In the fourth aspect of the present invention, it is desirable that the second lens unit has, in order from the object side, a negative lens, a positive lens, and a positive lens.

In the fourth aspect of the present invention, a negative lens directing a concave surface toward the object side is preferably located at the most object-side position of the second lens unit to satisfy Condition (5).

In the fourth aspect of the present invention, it is desirable to satisfy Condition (6).

In the fourth aspect of the present invention, a negative meniscus lens directing a concave surface toward the object side, of lenses constituting the first lens unit, is preferably placed at the most object-side position of the first lens unit.

In the fifth aspect of the present invention, it is desirable to satisfy Condition (3).

In the fifth aspect of the present invention, the lens with at least one aspherical surface in the third lens unit is preferably constructed of plastic.

In the fifth aspect of the present invention, it is desirable that the second lens unit has, in order from the object side, a negative lens, a positive lens, and a positive lens.

In the fifth aspect of the present invention, it is desirable to satisfy Condition (4).

In the fifth aspect of the present invention, a negative lens directing a concave surface toward the object side is preferably located at the most object-side position of the second lens unit to satisfy Condition (5).

In the fifth aspect of the present invention, a negative meniscus lens directing a concave surface toward the object side, of lenses constituting the first lens unit, is preferably placed at the most object-side position of the first lens unit.

Subsequently, reference is made to individual conditions in the present invention.

Condition (1) determines the power of the third lens unit. If the value of Condition (1) exceeds the upper limit, the power of the third lens unit will be weakened and hence the diameter of the last lens of the third lens unit must be enlarged. Consequently, compactness of the camera is impaired.

On the other hand, if the value of Condition (1) is below the lower limit, the power of the third lens unit will be strengthened, thus resulting in a reduction of the overall length at the telephoto position or of the diameter. However, strengthening the power of the third lens unit increases aberration, notably plus distortion at the wide-angle position. This is unfavorable because correction for distortion of the whole lens becomes difficult. If another lens is added to correct aberration, the entire lens length where the lens barrel is collapsed will be increased. This is in conflict with a slim and compact design of the camera.

When the third lens unit, instead of satisfying Condition (1), satisfies the following condition, a further improvement of performance and compactness can be favorably realized in a good balance:

$$0.6<|f3|/h<0.8 \tag{1'}$$

Condition (2) determines the power of the object-side lens of the third lens unit. If the value of Condition (2) exceeds the upper limit or passes the lower limit, the power of the lens will be strengthened. Therefore, distortion of the off-axis ray produced at the wide-angle position is increased, and it becomes difficult to correct an image plane. When the power is strengthened, the sensitivity of a change in focusing to the shift of the space between the object-side lens and the negative lens of the third lens unit constructed with two lenses becomes high. Consequently, it becomes difficult to fabricate the third lens unit, which is unfavorable.

Condition (3) determines the focal length at the wide-angle position. If the value of Condition (3) exceeds the upper limit, the field angle altogether unrelated to a wide-angle system will be obtained.

On the other hand, if the value of Condition (3) is below the upper limit, a wide-angle design can be achieved. However, since correction for aberration becomes difficult and at the same time, the lens diameter must be enlarged in order to obviate a decrease of the amount of marginal light. This makes compactness difficult.

Condition (4) determines the ratio between the focal length at the wide-angle position and the focal length of the first lens unit. If the value of Condition (4) exceeds the upper limit, the power of the first lens unit will be strengthened, and thus the amount of movement of lenses extending from the wide-angle position to the telephoto position is reduced, resulting in compactness of the camera. However, the amount of aberrations, such as axial chromatic aberration and curvature of field, at the telephoto position is increased and additional lenses are required to correct these aberrations. Consequently, the entire lens length where the lens barrel is collapsed will be increased. This is in conflict with a slim and compact design of the camera.

On the other hand, if the value of Condition (4) is below the lower limit, the power of the first lens unit will be weakened, and thus the amount of aberration is reduced. However, the amount of movement of lenses extending from the wide-angle position to the telephoto position is increased. This is contradictory to compactness of the camera.

When the first lens unit, instead of satisfying Condition (4), satisfies the following condition, a further improvement of performance and compactness can be favorably realized in a good balance:

$$0.4<fw/f1<0.55 \tag{4'}$$

Condition (5) determines the radius of curvature of the object-side surface of the negative lens located at the most object-side position in the second lens unit. If the value of Condition (5) exceeds the upper limit, the off-axis ray will pass through the second lens unit, separating from the optical axis. As a result, the diameter of the second lens unit must be increased, which is in conflict with a compact design. Since the principal point is shifted to the object side, the back focal distance becomes short.

On the other hand, if the value of Condition (5) is below the lower limit, spherical aberration produced in the positive lens of the second lens unit will be overcorrected. The off-axis ray passes through a position close to the optical axis and is not separated from the axial ray even at a distance from the stop. Hence, even though the aspherical surface is located at a distance from the stop, it becomes difficult to principally correct the off-axis ray.

When the second lens unit, instead of satisfying Condition (5), satisfies the following condition, a further improvement of performance and compactness can be favorably realized in a good balance:

$$0.45<|r_{211}|/f2<0.7 \tag{5'}$$

Condition (6) is adapted to favorably correct aberration in the second lens unit. If the value of Condition (6) exceeds the upper limit, the amount of aberration, notably coma, on the surface of the second lens unit at a distance from the stop will be increased. Consequently, correction for aberration in the second lens unit becomes difficult.

On the other hand, if the value of Condition (6) is below the lower limit, the power of the second lens unit will be strengthened and thereby the amount of residual aberration in the second lens unit is increased. As a result, when the magnification is changed, the amount of fluctuation of aberration is increased.

In the present invention, it is desirable that the negative meniscus lens directing a concave surface toward the object side is placed in the first lens unit. The object-side surface of the first lens unit is configured as a concave surface and the sign of distortion produced can be made negative so that positive distortion at the wide-angle position is not increased.

The embodiments of the present invention will be described below.

First Embodiment

FIGS. 1A–1C show lens arrangements in the first embodiment of the three-lens-unit zoom optical system according to present invention. FIGS. 2A–2D, 3A–3D, and 4A–4D show aberration characteristics in the first embodiment.

The three-lens-unit zoom optical system in the first embodiment comprises, in order from the object side, a first lens unit G1 with positive power, a stop S, a second lens unit G2 with positive power, and a third lens unit G3 with negative power.

The first lens unit GI with positive power includes, in order from the object side, a first lens $L1_1$ with negative power and a second lens $L1_2$ with positive power. The first lens $L1_1$ with negative power is a meniscus lens directing a concave surface toward the object side. The second lens $L1_2$ is a biconvex lens.

The second lens unit G2 with positive power includes, in order from the object side, the stop S, a first lens $L2_1$ with negative power, a second lens $L2_2$ with positive power, and a third lens $L2_3$ with positive power, having an aspherical surface on the object side. The first lens $L2_1$ with negative power is a meniscus lens whose concave surface is directed toward the object side. The second lens $L2_2$ with positive power is a biconvex lens. The third lens $L2_3$ is a meniscus lens whose concave surface is directed toward the object side.

The third lens unit G3 with negative power includes, in order form the object side, a first lens $L3_1$ with positive power, having an aspherical surface on the object side, and a second lens $L3_2$ with negative power. The first lens $L3_1$ with positive power is a meniscus lens whose concave surface is directed toward the object side. The second lens $L3_2$ with negative power is also a meniscus lens whose concave surface is directed toward the object side.

The first embodiment uses the zoom system that individual lens units are moved toward the object side so that when the magnification of the zoom optical system is changed, extending from the wide-angle position to the telephoto position, the space between the first lens unit G1 and the second lens unit G2 is widened and the space between the second lens unit G2 and the third lens unit G3 is narrowed.

The stop S is moved integrally with the second lens unit G2.

Subsequently, lens data of optical members constituting the three-lens-unit zoom optical system of the first embodiment are listed below.

Also, in the numerical data of the first embodiment, $r_1$, $r_2$, ... denote radii of curvature of individual lens surfaces; $d_1$, $d_2$, ... denote thicknesses of individual lenses or air spaces between them; $n_{d1}$, $nd_2$, ... denote refractive indices of individual lenses at the d line; $v_{d1}$, $v_{d2}$, ... denote Abbe's numbers of individual lenses, and FNO denotes an F-number. Also, when z is taken as the coordinate in the direction of the optical axis, y is taken as the coordinate normal to the optical axis, K represents a conic constant, and $A_4$, $A_6$, $A_8$, and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4y^4+A_6y^6+A_8y^8+A_{10}y^{10}$$

These symbols hold for the numerical data of the embodiments to be described later.

Numerical Data 1

Second Embodiment

Figure 5B:
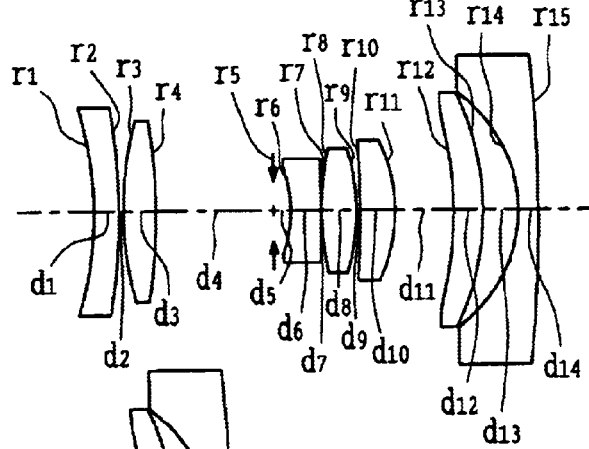
Figure 5C:
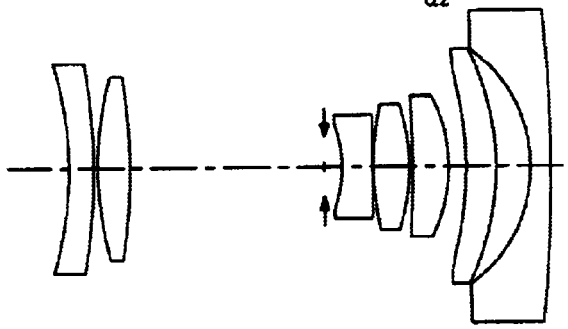

FIGS. 5A–5C show lens arrangements in the second embodiment of the three-lens-unit zoom optical system according to present invention. FIGS. 6A–6D, 7A–7D, and 8A–8D show aberration characteristics in the second embodiment.

The three-lens-unit zoom optical system in the second embodiment, as in the first embodiment, comprises, in order from the object side, the first lens unit G1 with positive power, the stop S, the second lens unit G2 with positive power, and the third lens unit G3 with negative power.

The first lens unit GI with positive power includes, in order from the object side, the first lens $L1_1$ with negative power and the second lens $L1_2$ with positive power. The second lens unit G2 with positive power includes, in order from the object side, the first lens $L2_1$ with negative power, the second lens $L2_2$ with positive power, and the third lens $L2_3$ with positive power, having an aspherical surface on the object side.

| | | | |
|---|---|---|---|
| $r_1 = -26.1046$ | | | |
| | $d_1 = 1.7194$ | $n_{d1} = 1.84666$ | $v_{d1} = 23.78$ |
| $r_2 = -43.0582$ | | | |
| | $d_2 = 0.1648$ | | |
| $r_3 = 30.5591$ | | | |
| | $d_3 = 2.7695$ | $n_{d3} = 1.51633$ | $v_{d3} = 64.14$ |
| $r_4 = -45.8224$ | | | |
| | $d_4 = D\ 4$ | | |
| $r_5 = \infty$ (stop) | | | |
| | $d_5 = 1.3000$ | | |
| $r_6 = -11.6219$ | | | |
| | $d_6 = 2.1058$ | $n_{d6} = 1.74100$ | $v_{d6} = 52.64$ |
| $r_7 = -820.5624$ | | | |
| | $d_7 = 0.2000$ | | |
| $r_8 = 25.3615$ | | | |
| | $d_8 = 3.2021$ | $n_{d8} = 1.51823$ | $v_{d8} = 58.90$ |
| $r_9 = -18.2603$ | | | |
| | $d_9 = 0.4674$ | | |
| $r_{10} = -503.4798$ (aspherical) | | | |
| | $d_{10} = 2.9128$ | $n_{d10} = 1.58313$ | $v_{d10} = 59.46$ |
| $r_{11} = -13.3757$ | | | |
| | $d_{11} = D\ 1\ 1$ | | |
| $r_{12} = -21.8387$ (aspherical) | | | |
| | $d_{12} = 2.50$ | $n_{d12} = 1.52542$ | $v_{d12} = 55.78$ |
| $r_{13} = -21.3079$ | | | |
| | $d_{13} = 3.1286$ | | |
| $r_{14} = -11.5619$ | | | |
| | $d_{14} = 1.4496$ | $n_{d14} = 1.78590$ | $v_{d14} = 44.20$ |
| $r_{15} = -118.5199$ | | | |

Aspherical coefficients

Tenth surface

K = 0
$A_4 = -1.1802 \times 10^{-4}$   $A_6 = -1.3155 \times 10^{-6}$   $A_8 = 4.6122 \times 10^{-8}$
$A_{10} = -8.3990 \times 10^{-10}$ Twelfth surface K = 0
$A_4 = 7.4366 \times 10^{-5}$   $A_6 = 7.3536 \times 10^{-7}$   $A_8 = -4.8394 \times 10^{-9}$
$A_{10} = 3.6179 \times 10^{-11}$ Zoom data

| | Wide-angle | Middle | Telephoto |
|---|---|---|---|
| Focal length | 28.97 | 54.9 | 96.61 |
| F N O | 5.8 | 8.5 | 12.0 |
| D 4 | 3.6 | 9.23 | 16.71 |
| D 1 1 | 10.71 | 5.43 | 2.15 |

The third lens unit G3 with negative power includes, in order form the object side, the first lens $L3_1$ with positive power, having an aspherical surface on the object side, and the second lens $L3_2$ with negative power.

The configurations of individual lenses are the same as those of the first embodiment.

The second embodiment uses the zoom system that individual lens units are moved toward the object side so that when the magnification of the zoom optical system is changed, extending from the wide-angle position to the telephoto position, the space between the first lens unit G1 and the second lens unit G2 is widened and the space between the second lens unit G2 and the third lens unit G3 is narrowed.

The stop S is moved integrally with the second lens unit G2.

Subsequently, lens data of optical members constituting the three-lens-unit zoom optical system of the second embodiment are listed below.

Numerical Data 2

Third Embodiment

Figure 9A:
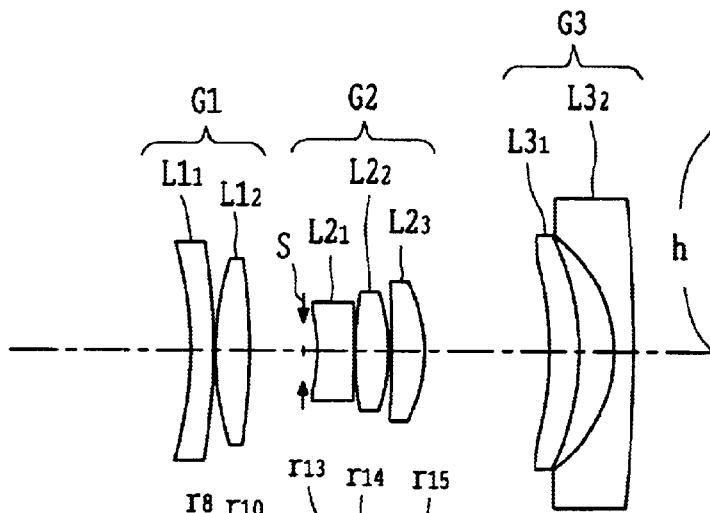
FIGS. 9A, 9B, and 9C are sectional views showing lens arrangements, developed along the optical axis, at wide-angle, middle, and telephoto positions, respectively, in a third embodiment of the three-lens-unit zoom optical system according to the present invention.
Figure 9B:
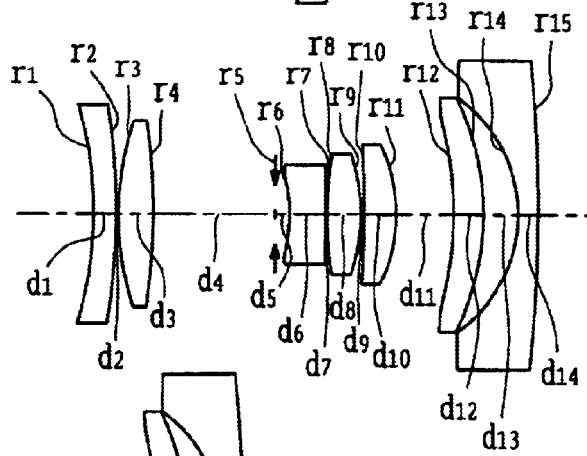
Figure 9C:
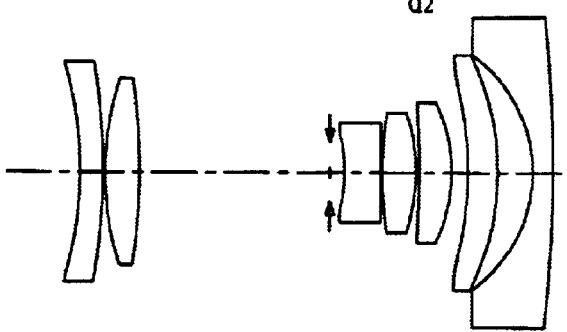

FIGS. 9A–9C show lens arrangements in the third embodiment of the three-lens-unit zoom optical system according to present invention. FIGS. 10A–10D, 11A–11D, and 12A–12D show aberration characteristics in the third embodiment.

The three-lens-unit zoom optical system in the third embodiment, as in the first embodiment, comprises, in order from the object side, the first lens unit G1 with positive power, the stop S, the second lens unit G2 with positive power, and the third lens unit G3 with negative power.

The first lens unit G1 with positive power includes, in order from the object side, the first lens $L1_1$, with negative power and the second lens $L1_2$ with positive power.

The second lens unit G2 with positive power includes, in order from the object side, the first lens $L2_1$ with negative power, the second lens $L2_2$ with positive power, and the third lens $L2_3$ with positive power, having an aspherical surface on the object side.

| | | | |
|---|---|---|---|
| $r_1 = -29.0482$ | | | |
| | $d_1 = 2.1001$ | $n_{d1} = 1.84666$ | $v_{d1} = 23.78$ |
| $r_2 = -51.3356$ | | | |
| | $d_2 = 0.3098$ | | |
| $r_3 = 26.3085$ | | | |
| | $d_3 = 2.7899$ | $n_{d3} = 1.51633$ | $v_{d3} = 64.14$ |
| $r_4 = -59.0919$ | | | |
| | $d_4 = D\,4$ | | |
| $r_5 = \infty$ (stop) | | | |
| | $d_5 = 1.3000$ | | |
| $r_6 = -11.4998$ | | | |
| | $d_6 = 2.7278$ | $n_{d6} = 1.74320$ | $v_{d6} = 49.34$ |
| $r_7 = -151.6003$ | | | |
| | $d_7 = 0.1041$ | | |
| $r_8 = 26.0792$ | | | |
| | $d_8 = 2.8927$ | $n_{d8} = 1.51742$ | $v_{d8} = 52.43$ |
| $r_9 = -18.7805$ | | | |
| | $d_9 = 0.2668$ | | |
| $r_{10} = -248.2211$ (aspherical) | | | |
| | $d_{10} = 2.9286$ | $n_{d10} = 1.58313$ | $v_{d10} = 59.46$ |
| $r_{11} = -13.4032$ | | | |
| | $d_{11} = D\,1\,1$ | | |
| $r_{12} = -23.6440$ (aspherical) | | | |
| | $d_{12} = 2.5000$ | $n_{d12} = 1.52542$ | $v_{d12} = 55.78$ |
| $r_{13} = -22.5766$ | | | |
| | $d_{13} = 2.9367$ | | |
| $r_{14} = -11.7428$ | | | |
| | $d_{14} = 1.6000$ | $n_{d14} = 1.79952$ | $v_{d14} = 42.22$ |
| $r_{15} = -151.5947$ | | | |

Aspherical coefficients

Tenth surface $K = 0$
$A_4 = -1.2744 \times 10^{-4}$  $A_6 = -9.8834 \times 10^{-7}$  $A_8 = 3.6110 \times 10^{-8}$
$A_{10} = -6.2108 \times 10^{-10}$ Twelfth surface $K = 0$
$A_4 = 7.7228 \times 10^{-5}$  $A_6 = 7.3331 \times 10^{-7}$  $A_8 = -7.4042 \times 10^{-9}$
$A_{10} = 5.1027 \times 10^{-11}$ Zoom data

| | Wide-angle | Middle | Telephoto |
|---|---|---|---|
| Focal length | 28.96 | 54.9 | 100.33 |
| F N O | 4.7 | 8.1 | 12.4 |
| D 4 | 4.45 | 10.22 | 16.94 |
| D 1 1 | 10.31 | 5.11 | 1.76 |

The third lens unit G3 with negative power includes, in order form the object side, the first lens $L3_1$ with positive power, having an aspherical surface on the object side, and the second lens $L3_2$ with negative power.

The configurations of individual lenses are the same as those of the first embodiment.

The third embodiment uses the zoom system that individual lens units are moved toward the object side so that when the magnification of the zoom optical system is changed, extending from the wide-angle position to the telephoto position, the space between the first lens unit G1 and the second lens unit G2 is widened and the space between the second lens unit G2 and the third lens unit G3 is narrowed.

The stop S is moved integrally with the second lens unit G2.

Subsequently, lens data of optical members constituting the three-lens-unit zoom optical system of the third embodiment are listed below.

Numerical Data 3

Fourth Embodiment

Figure 13A:
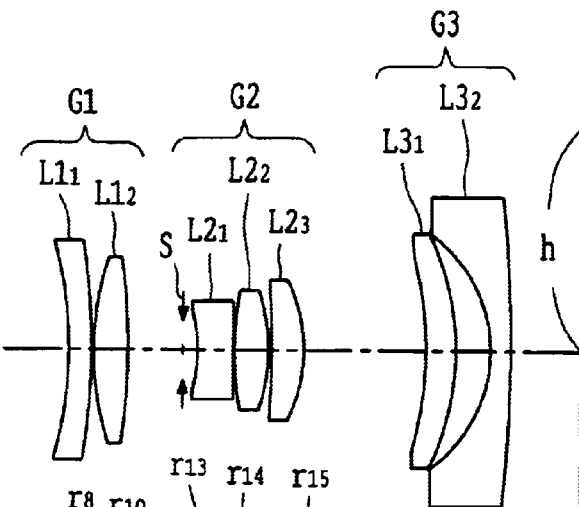
FIGS. 13A, 13B, and 13C are sectional views showing lens arrangements, developed along the optical axis, at wide-angle, middle, and telephoto positions, respectively, in a fourth embodiment of the three-lens-unit zoom optical system according to the present invention.
Figure 13B:
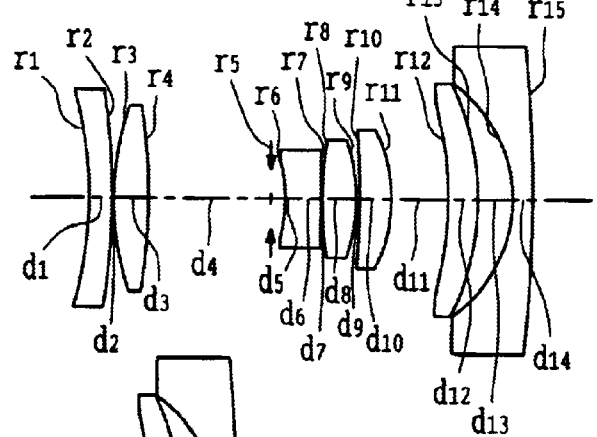
Figure 13C:
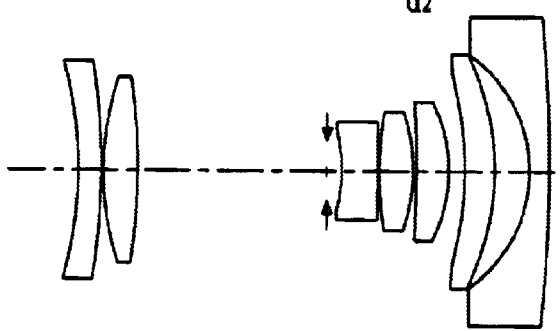
Figure 15A:
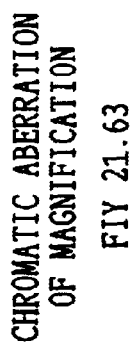
FIGS. 15A, 15B, 15C, and 15D are diagrams showing aberration characteristics at the middle position in the fourth embodiment.
Figure 15B:
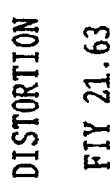
Figure 15C:
Figure 15D:
Figures 16A, 16B, 16C, 16D:
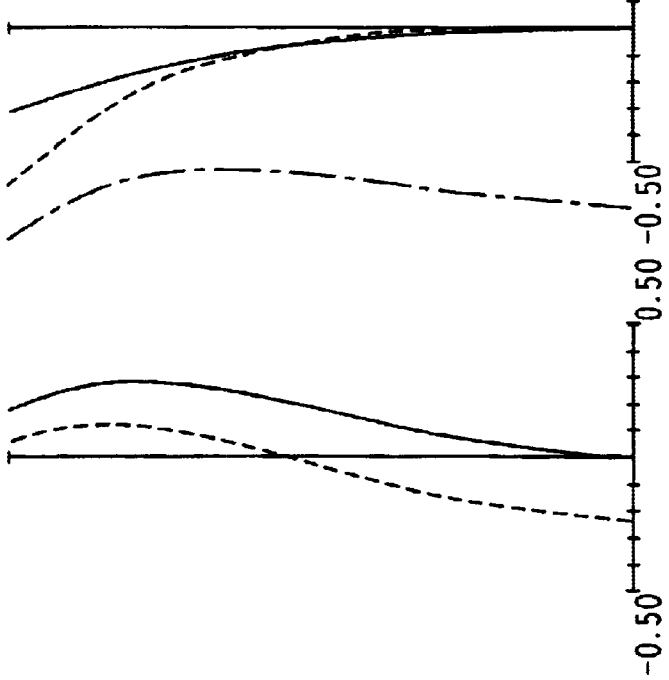
FIGS. 16A, 16B, 16C, and 16D are diagrams showing aberration characteristics at the telephoto position in the fourth embodiment.

FIGS. 13A–13C show lens arrangements in the fourth embodiment of the three-lens-unit zoom optical system according to present invention. FIGS. 14A–14D, 15A–15D, and 16A–16D show aberration characteristics in the fourth embodiment.

The three-lens-unit zoom optical system in the fourth embodiment, as in the first embodiment, comprises, in order from the object side, the first lens unit G1 with positive power, the stop S, the second lens unit G2 with positive power, and the third lens unit G3 with negative power.

The first lens unit G1 with positive power includes, in order from the object side, the first lens $L1_1$ with negative power and the second lens $L1_2$ with positive power.

The second lens unit G2 with positive power includes, in order from the object side, the first lens $L2_1$ with negative power, the second lens $L2_2$ with positive power, and the third lens $L2_3$ with positive power, having an aspherical surface on the object side.

| | | | |
|---|---|---|---|
| $r_1 = -29.7766$ | | | |
| | $d_1 = 1.8897$ | $n_{d1} = 1.84666$ | $v_{d1} = 23.78$ |
| $r_2 = -52.7655$ | | | |
| | $d_2 = 0.2005$ | | |
| $r_3 = 25.5122$ | | | |
| | $d_3 = 2.9281$ | $n_{d3} = 1.51633$ | $v_{d3} = 64.14$ |
| $r_4 = -64.0366$ | | | |
| | $d_4 = D\ 4$ | | |
| $r_5 = \infty$ (stop) | | | |
| | $d_5 = 1.3000$ | | |
| $r_6 = -11.5267$ | | | |
| | $d_6 = 3.0242$ | $n_{d6} = 1.74320$ | $v_{d6} = 49.34$ |
| $r_7 = -128.8692$ | | | |
| | $d_7 = 0.1000$ | | |
| $r_8 = 25.8951$ | | | |
| | $d_8 = 2.7952$ | $n_{d8} = 1.51742$ | $v_{d8} = 52.43$ |
| $r_9 = -18.6316$ | | | |
| | $d_9 = 0.2574$ | | |
| $r_{10} = -180.2551$ (aspherical) | | | |
| | $d_{10} = 2.7144$ | $n_{d10} = 1.58313$ | $v_{d10} = 59.46$ |
| $r_{11} = -13.5694$ | | | |
| | $d_{11} = D\ 1\ 1$ | | |
| $r_{12} = -23.9971$ (aspherical) | | | |
| | $d_{12} = 2.5000$ | $n_{d12} = 1.52542$ | $v_{d12} = 55.78$ |
| $r_{13} = -22.2582$ | | | |
| | $d_{13} = 2.7767$ | | |
| $r_{14} = -11.9656$ | | | |
| | $d_{14} = 1.6000$ | $n_{d14} = 1.79952$ | $v_{d14} = 42.22$ |
| $r_{15} = -195.1772$ | | | |

Aspherical coefficients

Tenth surface $K = 0$
$A_4 = -1.2883 \times 10^{-4}$   $A_6 = -8.6350 \times 10^{-7}$   $A_8 = 3.7816 \times 10^{-8}$
$A_{10} = -8.3820 \times 10^{-10}$ Twelfth surface $K = 0$
$A_4 = 7.8640 \times 10^{-5}$   $A_6 = 6.7540 \times 10^{-7}$   $A_8 = -7.2079 \times 10^{-9}$
$A_{10} = 4.6708 \times 10^{-11}$ Zoom data

| | Wide-angle | Middle | Telephoto |
|---|---|---|---|
| Focal length | 28.5 | 54.8 | 96.6 |
| F N O | 4.7 | 8.0 | 12.2 |
| D 4 | 4.55 | 10.58 | 16.47 |
| D 1 1 | 10.44 | 5.01 | 1.81 |

The third lens unit G3 with negative power includes, in order form the object side, the first lens L3$_1$ with positive power, having an aspherical surface on the object side, and the second lens L3$_2$ with negative power.

The configurations of individual lenses are the same as those of the first embodiment.

The fourth embodiment uses the zoom system that individual lens units are moved toward the object side so that when the magnification of the zoom optical system is changed, extending from the wide-angle position to the telephoto position, the space between the first lens unit G1 and the second lens unit G2 is widened and the space between the second lens unit G2 and the third lens unit G3 is narrowed.

The stop S is moved integrally with the second lens unit G2.

Subsequently, lens data of optical members constituting the three-lens-unit zoom optical system of the fourth embodiment are listed below.

Numerical Data 4

Fifth Embodiment

Figure 17A:
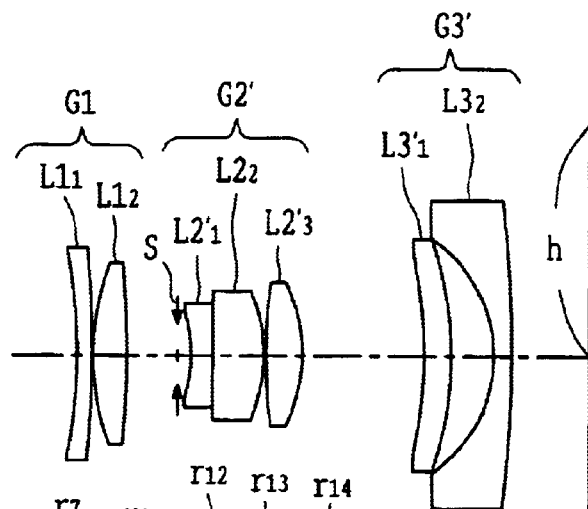
FIGS. 17A, 17B, and 17C are sectional views showing lens arrangements, developed along the optical axis, at wide-angle, middle, and telephoto positions, respectively, in a fifth embodiment of the three-lens-unit zoom optical system according to the present invention.
Figure 17B:
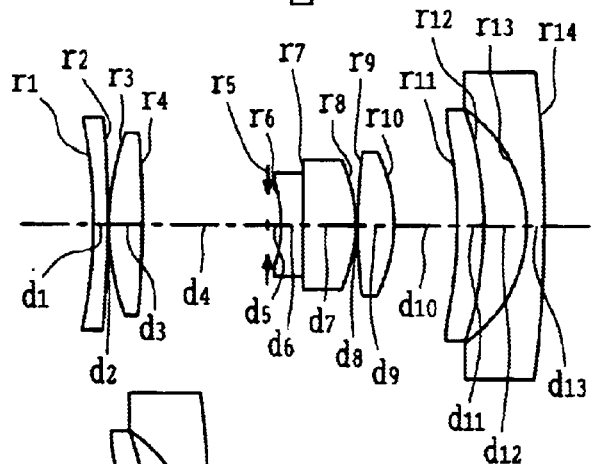
Figure 17C:
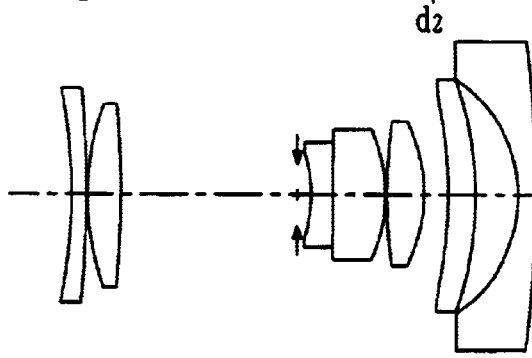
Figure 19A:
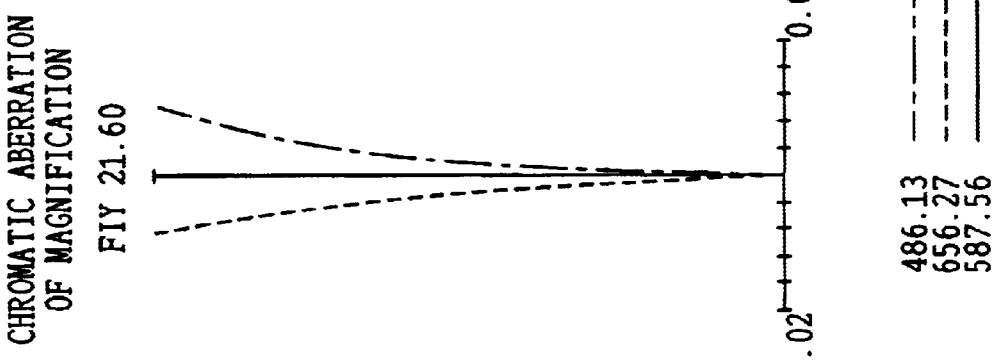
FIGS. 19A, 19B, 19C, and 19D are diagrams showing aberration characteristics at the middle position in the fifth embodiment.
Figure 19B:
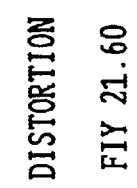
Figure 19C:
Figure 19D:

FIGS. 17A–17C show lens arrangements in the fifth embodiment of the three-lens-unit zoom optical system according to present invention. FIGS. 18A–18D, 19A–19D, and 20A–20D show aberration characteristics in the fifth embodiment.

The three-lens-unit zoom optical system in the fifth embodiment comprises, in order from the object side, the first lens unit G1 with positive power, the stop S, a second lens unit G2' with positive power, and a third lens unit G3' with negative power.

The first lens unit G1 with positive power includes, in order from the object side, the first lens L1$_1$ with negative power and the second lens L1$_2$ with positive power.

The second lens unit G2' with positive power includes, in order from the object side, a first lens L2$_1$' with negative power, having an aspherical surface on the object side, the second lens L2$_2$ with positive power, and a third lens L2$_3$' with positive power. The first lens L2$_1$' with negative power and the second lens L2$_2$ with positive power are cemented.

The third lens unit G3' with negative power includes, in order form the object side, a first lens L3$_1$' with negative

| | | | |
|---|---|---|---|
| $r_1 = -29.7754$ | | | |
| | $d_1 = 1.8898$ | $n_{d1} = 1.84666$ | $v_{d1} = 23.78$ |
| $r_2 = -52.7649$ | | | |
| | $d_2 = 0.2006$ | | |
| $r_3 = 25.5121$ | | | |
| | $d_3 = 2.9282$ | $n_{d3} = 1.51633$ | $v_{d3} = 64.14$ |
| $r_4 = -64.0326$ | | | |
| | $d_4 = D\,4$ | | |
| $r_5 = \infty$ (stop) | | | |
| | $d_5 = 1.3000$ | | |
| $r_6 = -11.5273$ | | | |
| | $d_6 = 3.0241$ | $n_{d6} = 1.74320$ | $v_{d6} = 49.34$ |
| $r_7 = -128.7316$ | | | |
| | $d_7 = 0.1000$ | | |
| $r_8 = 25.8886$ | | | |
| | $d_8 = 2.7963$ | $n_{d8} = 1.51742$ | $v_{d8} = 52.43$ |
| $r_9 = -18.6305$ | | | |
| | $d_9 = 0.2631$ | | |
| $r_{10} = -180.6129$ (aspherical) | | | |
| | $d_{10} = 2.712$ | $n_{d10} = 1.58313$ | $v_{d10} = 59.46$ |
| $r_{11} = -13.5683$ | | | |
| | $d_{11} = D\,1\,1$ | | |
| $r_{12} = -23.9631$ (aspherical) | | | |
| | $d_{12} = 2.5000$ | $n_{d12} = 1.52542$ | $v_{d12} = 55.78$ |
| $r_{13} = -22.2286$ | | | |
| | $d_{13} = 2.7767$ | | |
| $r_{14} = -11.9621$ | | | |
| | $d_{14} = 1.6000$ | $n_{d14} = 1.79952$ | $v_{d14} = 42.22$ |
| $r_{15} = -196.5289$ | | | |

Aspherical coefficients

Tenth surface $K = 0$
$A_4 = -1.3080 \times 10^{-4}$     $A_6 = -3.3800 \times 10^{-7}$     $A_8 = -5.9570 \times 10^{-9}$
$A_{10} = 2.6706 \times 10^{-10}$ Twelfth surface $K = 0$
$A_4 = 7.9894 \times 10^{-5}$     $A_6 = 6.1048 \times 10^{-7}$     $A_8 = -6.2957 \times 10^{-9}$
$A_{10} = 4.2811 \times 10^{-11}$ Zoom data

| | Wide-angle | Middle | Telephoto |
|---|---|---|---|
| Focal length | 28.97 | 54.8 | 96.6 |
| F N O | 4.7 | 8.0 | 12.4 |
| D 4 | 4.75 | 10.58 | 16.47 |
| D 1 1 | 10.27 | 5.01 | 1.82 | power, having an aspherical surface on the object side, and the second lens L3₂ with negative power.

The configurations of individual lenses in the first and third lens units are the same as those of the first embodiment. In the second lens unit G2', each of the first lens $L2_1'$ with negative power and the second lens $L2_2$ with positive power is a meniscus lens directing a concave surface toward the object side. The third lens $L2_3'$ with positive power is a biconvex lens.

The fifth embodiment uses the zoom system that individual lens units are moved toward the object side so that when the magnification of the zoom optical system is changed, extending from the wide-angle position to the telephoto position, the space between the first lens unit G1 and the second lens unit G2' is widened and the space between the second lens unit G2' and the third lens unit G3' is narrowed.

The stop S is moved integrally with the second lens unit G2'.

Subsequently, lens data of optical members constituting the three-lens-unit zoom optical system of the fifth embodiment are listed below.

Numerical Data 5

Sixth Embodiment

Figure 21A:
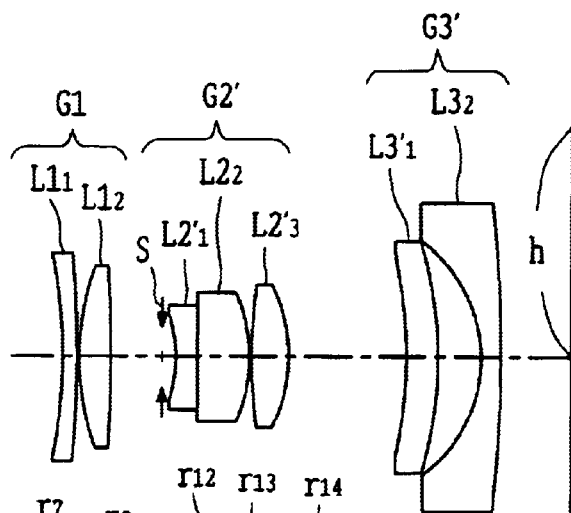
FIGS. 21A, 21B, and 21C are sectional views showing lens arrangements, developed along the optical axis, at wide-angle, middle, and telephoto positions, respectively, in a sixth embodiment of the three-lens-unit zoom optical system according to the present invention.
Figure 21B:
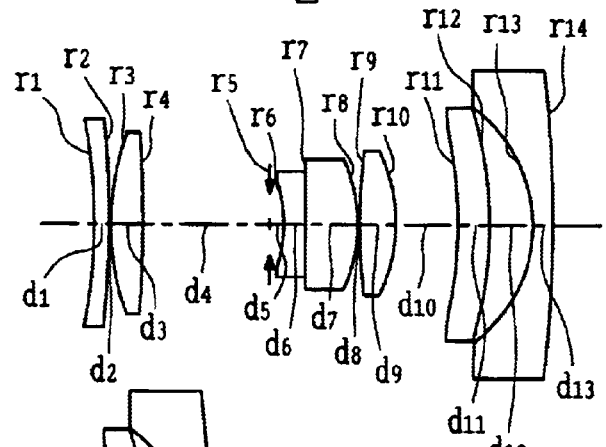
Figure 21C:
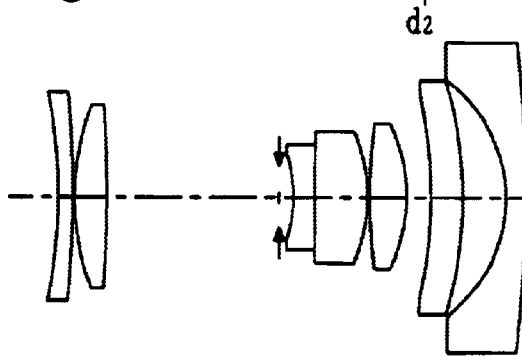

FIGS. 21A–21C show lens arrangements in the sixth embodiment of the three-lens-unit zoom optical system according to present invention. FIGS. 22A–22D, 23A–23D, and 24A–24D show aberration characteristics in the sixth embodiment.

The three-lens-unit zoom optical system in the sixth embodiment, as in the fifth embodiment, comprises, in order from the object side, the first lens unit G1 with positive power, the stop S, the second lens unit G2' with positive power, and the third lens unit G3' with negative power.

The first lens unit G1 with positive power includes, in order from the object side, the first lens $L1_1$ with negative power and the second lens $L1_2$ with positive power.

The second lens unit G2' with positive power includes, in order from the object side, the first lens $L2_1'$ with negative power, having an aspherical surface on the object side, the second lens $L2_2$ with positive power, and the third lens $L2_3'$ with positive power. The first lens $L2_1'$ with negative power and the second lens $L2_2$ with positive power are cemented.

| | | | |
|---|---|---|---|
| $r_1 = -39.0000$ | | | |
| | $d_1 = 1.1800$ | $n_{d1} = 1.80518$ | $v_{d1} = 25.42$ |
| $r_2 = -103.1705$ | | | |
| | $d_2 = 0.1500$ | | |
| $r_3 = 22.2787$ | | | |
| | $d_3 = 2.7126$ | $n_{d3} = 1.51823$ | $v_{d3} = 58.90$ |
| $r_4 = -108.8075$ | | | |
| | $d_4 = D\ 4$ | | |
| $r_5 = \infty$ (stop) | | | |
| | $d_5 = 1.2000$ | | |
| $r_6 = -13.0300$ (aspherical) | | | |
| | $d_6 = 1.8000$ | $n_{d6} = 1.80610$ | $v_{d6} = 40.92$ |
| $r_7 = -325.7145$ | | | |
| | $d_7 = 4.2500$ | $n_{d7} = 1.56732$ | $v_{d7} = 42.84$ |
| $r_8 = -13.1713$ | | | |
| | $d_8 = 0.2165$ | | |
| $r_9 = 52.6735$ | | | |
| | $d_9 = 2.9578$ | $n_{d9} = 1.48749$ | $v_{d9} = 70.23$ |
| $r_{10} = -13.2575$ | | | |
| | $d_{10} = D\ 10$ | | |
| $r_{11} = -26.7500$ (aspherical) | | | |
| | $d_{11} = 2.2000$ | $n_{d11} = 1.52542$ | $v_{d11} = 55.78$ |
| $r_{12} = -29.5301$ | | | |
| | $d_{12} = 3.5002$ | | |
| $r_{13} = -11.3172$ | | | |
| | $d_{13} = 1.5500$ | $n_{d13} = 1.80400$ | $v_{d13} = 46.57$ |
| $r_{14} = -92.1889$ | | | |

Aspherical coefficients

Sixth surface $K = 0$
$A_4 = -1.5082 \times 10^{-4}$   $A_6 = -1.9799 \times 10^{-6}$   $A_8 = 8.0553 \times 10^{-8}$
$A_{10} = -7.0926 \times 10^{-9}$ Eleventh surface $K = -1.0728$
$A_4 = 7.4870 \times 10^{-5}$   $A_6 = 3.7173 \times 10^{-7}$   $A_8 = -3.8027 \times 10^{-9}$
$A_{10} = 4.3625 \times 10^{-11}$ Zoom data

| | Wide-angle | Middle | Telephoto |
|---|---|---|---|
| Focal length | 28.97 | 52.87 | 96.5 |
| F N O | 5.8 | 8.0 | 12.0 |
| D 4 | 4.2 | 10.65 | 15.04 |
| D 1 0 | 9.81 | 5.25 | 2.30 |

The third lens unit G3' with negative power includes, in order form the object side, the first lens $L3_1'$ with negative power, having an aspherical surface on the object side, and the second lens $L3_2$ with negative power.

The configurations of individual lenses are the same as those of the fifth embodiment.

The sixth embodiment uses the zoom system that individual lens units are moved toward the object side so that when the magnification of the zoom optical system is changed, extending from the wide-angle position to the telephoto position, the space between the first lens unit G1 and the second lens unit G2' is widened and the space between the second lens unit G2' and the third lens unit G3' is narrowed.

The stop S is moved integrally with the second lens unit G2'.

Subsequently, lens data of optical members constituting the three-lens-unit zoom optical system of the sixth embodiment are listed below.

Numerical Data 6

Seventh Embodiment

Figure 25A:
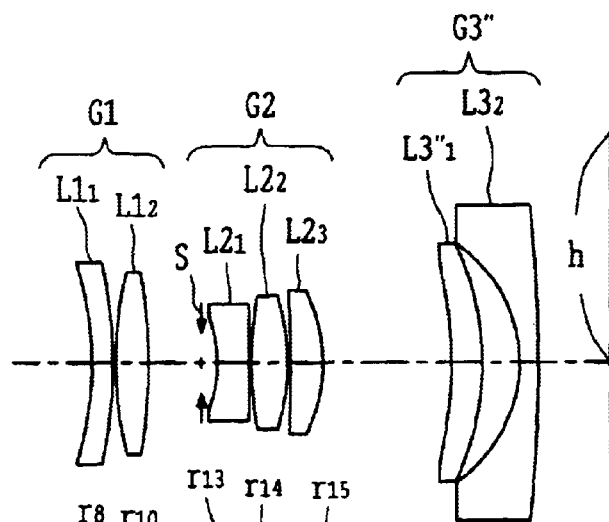
FIGS. 25A, 25B, and 25C are sectional views showing lens arrangements, developed along the optical axis, at wide-angle, middle, and telephoto positions, respectively, in a seventh embodiment of the three-lens-unit zoom optical system according to the present invention.
Figure 25B:
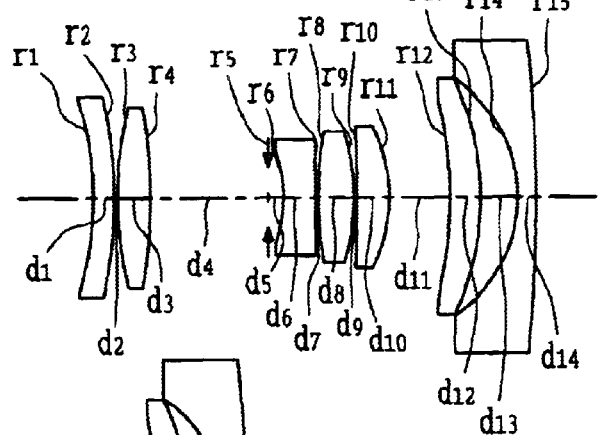
Figure 25C:
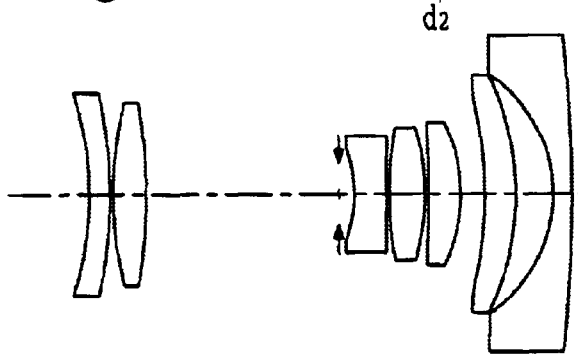
Figure 26A:
FIGS. 26A, 26B, 26C, and 26D are diagrams showing aberration characteristics at the wide-angle position in the seventh embodiment.
Figure 26B:
Figure 26C:
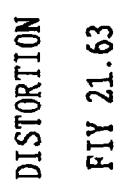
Figure 26D:
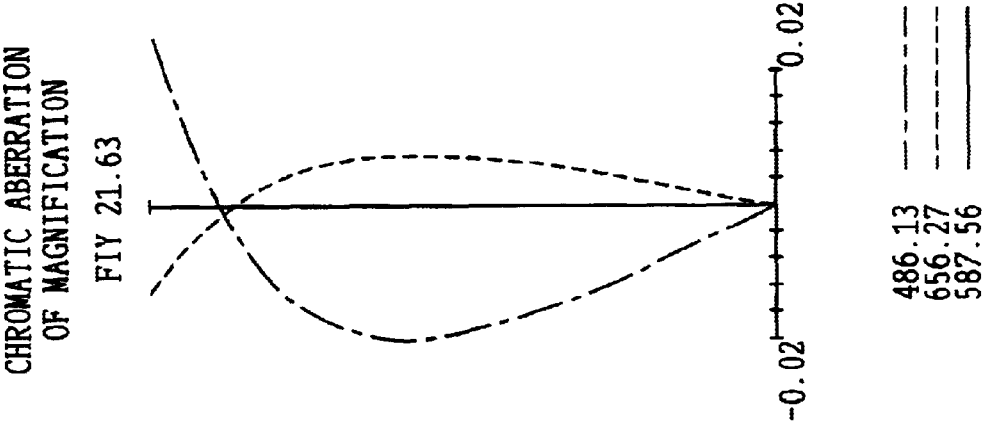

FIGS. 25A–25C show lens arrangements in the seventh embodiment of the three-lens-unit zoom optical system according to present invention. FIGS. 26A–26D, 27A–27D, and 28A–28D show aberration characteristics in the seventh embodiment.

The three-lens-unit zoom optical system in the seventh embodiment comprises, in order from the object side, the first lens unit G1 with positive power, the stop S, the second lens unit G2 with positive power, and a third lens unit G3" with negative power.

The first lens unit G1 with positive power includes, in order from the object side, the first lens $L1_1$ with negative power and the second lens $L1_2$ with positive power.

The second lens unit G2 with positive power includes, in order from the object side, the first lens $L2_1$ with negative power, the second lens $L2_2$ with positive power, and the third lens $L2_3$ with positive power, having an aspherical surface on the object side.

The third lens unit G3" with negative power includes, in order form the object side, a first lens $L3_1"$ with positive power, having aspherical surfaces on both sides, and the second lens $L3_2$ with negative power.

| | | | |
|---|---|---|---|
| $r_1 = -38.8000$ | | | |
| | $d_1 = 1.1800$ | $n_{d1} = 1.85415$ | $v_{d1} = 23.78$ |
| $r_2 = -107.3772$ | | | |
| | $d_2 = 0.1500$ | | |
| $r_3 = 21.4077$ | | | |
| | $d_3 = 2.6873$ | $n_{d3} = 1.51952$ | $v_{d3} = 52.43$ |
| $r_4 = -106.9403$ | | | |
| | $d_4 = D\ 4$ | | |
| $r_5 = \infty$ (stop) | | | |
| | $d_5 = 1.2000$ | | |
| $r_6 = -13.0400$ (aspherical) | | | |
| | $d_6 = 1.8000$ | $n_{d6} = 1.81028$ | $v_{d6} = 40.92$ |
| $r_7 = -324.8862$ | | | |
| | $d_7 = 4.2929$ | $n_{d7} = 1.55069$ | $v_{d7} = 45.79$ |
| $r_8 = -12.5111$ | | | |
| | $d_8 = 0.2200$ | | |
| $r_9 = 54.5595$ | | | |
| | $d_9 = 3.0000$ | $n_{d9} = 1.48898$ | $v_{d9} = 70.23$ |
| $r_{10} = -13.1439$ | | | |
| | $d_{10} = D\ 1\ 0$ | | |
| $r_{11} = -26.1000$ (aspherical) | | | |
| | $d_{11} = 2.5000$ | $n_{d11} = 1.52745$ | $v_{d11} = 55.78$ |
| $r_{12} = -34.8496$ | | | |
| | $d_{12} = 3.4945$ | | |
| $r_{13} = -11.6221$ | | | |
| | $d_{13} = 1.5500$ | $n_{d13} = 1.77582$ | $v_{d13} = 49.60$ |
| $r_{14} = -120.4014$ | | | |

Aspherical coefficients

Sixth surface $K = 0$
$A_4 = -1.6232 \times 10^{-4}$     $A_6 = -2.3650 \times 10^{-6}$     $A_8 = 7.9432 \times 10^{-8}$
$A_{10} = -7.0944 \times 10^{-9}$ Eleventh surface $K = -0.9862$
$A_4 = 7.4130 \times 10^{-5}$     $A_6 = 3.3125 \times 10^{-7}$     $A_8 = -3.6218 \times 10^{-9}$
$A_{10} = 3.6949 \times 10^{-11}$ Zoom data

| | Wide-angle | Middle | Telephoto |
|---|---|---|---|
| Focal length | 28.86 | 52.81 | 96.87 |
| F N O | 5.8 | 8.0 | 12.0 |
| D 4 | 4.19 | 10.55 | 14.63 |
| D 1 0 | 9.53 | 5.19 | 2.39 |

The configurations of individual lenses are the same as those of the first embodiment.

The seventh embodiment uses the zoom system that individual lens units are moved toward the object side so that when the magnification of the zoom optical system is changed, extending from the wide-angle position to the telephoto position, the space between the first lens unit G1 and the second lens unit G2 is widened and the space between the second lens unit G2 and the third lens unit G3″ is narrowed.

The stop S is moved integrally with the second lens unit G2.

Subsequently, lens data of optical members constituting the three-lens-unit zoom optical system of the seventh embodiment are listed below.

Numerical Data 7

Eighth Embodiment

Figure 29A:
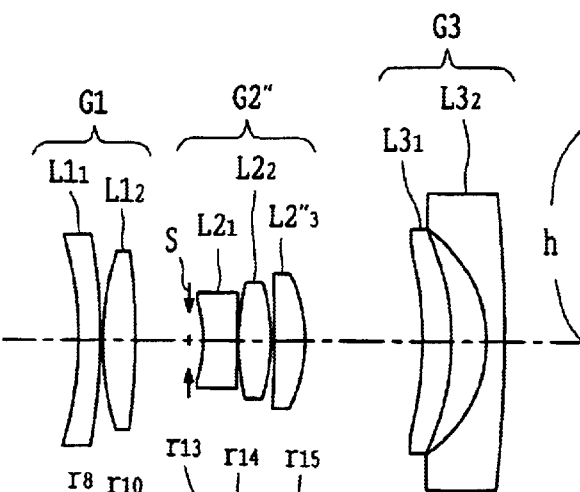
FIGS. 29A, 29B, and 29C are sectional views showing lens arrangements, developed along the optical axis, at wide-angle, middle, and telephoto positions, respectively, in an eighth embodiment of the three-lens-unit zoom optical system according to the present invention.
Figure 29B:
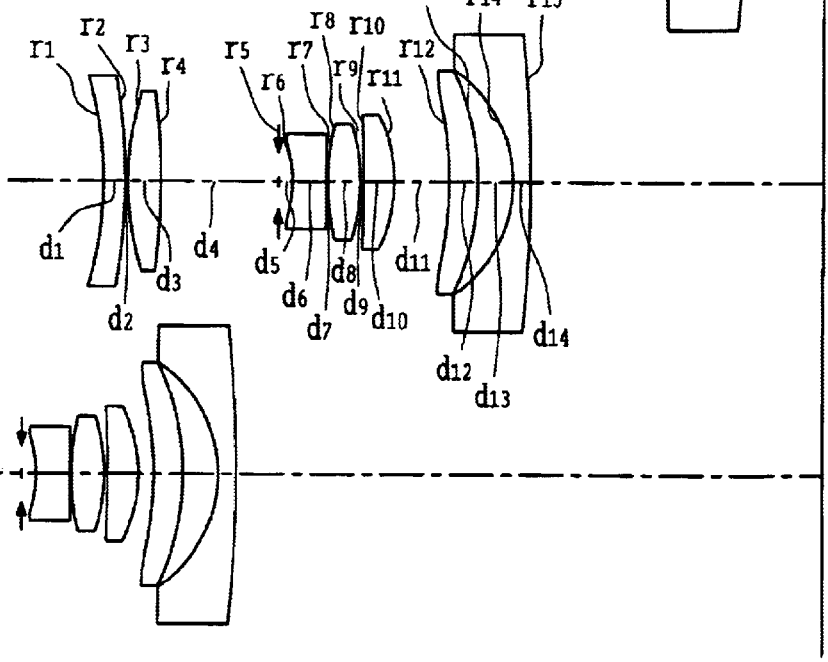
Figure 29C:
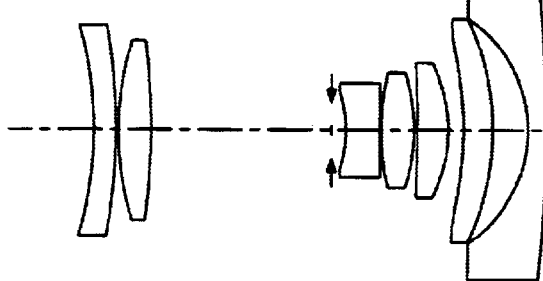

FIGS. 29A–29C show lens arrangements in the eighth embodiment of the three-lens-unit zoom optical system according to present invention. FIGS. 30A–30D, 31A–31D, and 32A–32D show aberration characteristics in the eighth embodiment.

The three-lens-unit zoom optical system in the eighth embodiment comprises, in order from the object side, the first lens unit G1 with positive power, the stop S, a second lens unit G2″ with positive power, and the third lens unit G3 with negative power.

The first lens unit G1 with positive power includes, in order from the object side, the first lens $L1_1$ with negative power and the second lens $L1_2$ with positive power.

The second lens unit G2″ with positive power includes, in order from the object side, the first lens $L2_1$ with negative

| | | | |
|---|---|---|---|
| $r_1 = -26.2811$ | | | |
| | $d_1 = 1.6867$ | $n_{d1} = 1.84666$ | $v_{d1} = 23.78$ |
| $r_2 = -43.9546$ | | | |
| | $d_2 = 0.2322$ | | |
| $r_3 = 29.6705$ | | | |
| | $d_3 = 2.8165$ | $n_{d3} = 1.51633$ | $v_{d3} = 64.14$ |
| $r_4 = -46.5840$ | | | |
| | $d_4 = D\ 4$ | | |
| $r_5 = \infty$ (stop) | | | |
| | $d_5 = 1.3000$ | | |
| $r_6 = -11.4783$ | | | |
| | $d_6 = 2.6597$ | $n_{d6} = 1.74100$ | $v_{d6} = 52.64$ |
| $r_7 = -197.8995$ | | | |
| | $d_7 = 0.1948$ | | |
| $r_8 = 26.4936$ | | | |
| | $d_8 = 2.9680$ | $n_{d8} = 1.51823$ | $v_{d8} = 58.90$ |
| $r_9 = -18.6119$ | | | |
| | $d_9 = 0.2648$ | | |
| $r_{10} = -563.9304$ (aspherical) | | | |
| | $d_{10} = 2.6895$ | $n_{d10} = 1.58313$ | $v_{d10} = 59.46$ |
| $r_{11} = -13.6507$ | | | |
| | $d_{11} = D\ 1\ 1$ | | |
| $r_{12} = -23.7375$ (aspherical) | | | |
| | $d_{12} = 2.5000$ | $n_{d12} = 1.52542$ | $v_{d12} = 55.78$ |
| $r_{13} = -22.5767$ (aspherical) | | | |
| | $d_{13} = 3.0176$ | | |
| $r_{14} = -11.5482$ | | | |
| | $d_{14} = 1.6000$ | $n_{d14} = 1.78590$ | $v_{d14} = 44.20$ |
| $r_{15} = -140.2510$ | | | |

Aspherical coefficients

Tenth surface $K = 0$
$A_4 = -1.2112 \times 10^{-4}$   $A_6 = -1.0389 \times 10^{-6}$   $A_8 = 5.3158 \times 10^{-8}$
$A_{10} = -9.8418 \times 10^{-10}$ Twelfth surface $K = 0$
$A_4 = 9.6543 \times 10^{-5}$   $A_6 = 2.0172 \times 10^{-7}$   $A_8 = -1.1396 \times 10^{-9}$
$A_{10} = 2.1057 \times 10^{-11}$ Thirteenth surface $K = 0$
$A_4 = 1.4209 \times 10^{-5}$   $A_6 = -1.2014 \times 10^{-7}$   $A_8 = 3.8122 \times 10^{-10}$
$A_{10} = -7.5176 \times 10^{-12}$

| Zoom data | | | |
|---|---|---|---|
| | Wide-angle | Middle | Telephoto |
| Focal length | 29.04 | 55.08 | 96.6 |
| F N O | 5.8 | 8.3 | 10.8 |
| D 4 | 4.51 | 9.89 | 16.48 |
| D 1 1 | 10.44 | 5.22 | 2.06 | power, the second lens $L2_2$ with positive power, and a third lens $L2_3''$ with positive power, having aspherical surfaces on both sides.

The third lens unit G3 with negative power includes, in order form the object side, the first lens $L3_1$ with positive power, having an aspherical surface on the object side, and the second lens $L3_2$ with negative power.

between the second lens unit G2" and the third lens unit G3 is narrowed.

The stop S is moved integrally with the second lens unit G2".

Subsequently, lens data of optical members constituting the three-lens-unit zoom optical system of the eighth embodiment are listed below.

Numerical Data 8

| | | | |
|---|---|---|---|
| $r_1 = -29.7768$ | | | |
| | $d_1 = 1.8899$ | $n_{d1} = 1.84666$ | $v_{d1} = 23.78$ |
| $r_2 = -52.7651$ | | | |
| | $d_2 = 0.2019$ | | |
| $r_3 = 25.5153$ | | | |
| | $d_3 = 2.9286$ | $n_{d3} = 1.51633$ | $v_{d3} = 64.14$ |
| $r_4 = -64.0420$ | | | |
| | $d_4 = D\ 4$ | | |
| $r_5 = \infty$ (stop) | | | |
| | $d_5 = 1.3000$ | | |
| $r_6 = -11.5278$ | | | |
| | $d_6 = 3.0241$ | $n_{d6} = 1.74320$ | $v_{d6} = 49.34$ |
| $r_7 = -128.7452$ | | | |
| | $d_7 = 0.1000$ | | |
| $r_8 = 25.8930$ | | | |
| | $d_8 = 2.7924$ | $n_{d8} = 1.51742$ | $v_{d8} = 52.43$ |
| $r_9 = -18.6314$ | | | |
| | $d_9 = 0.2560$ | | |
| $r_{10} = -180.6186$ (aspherical) | | | |
| | $d_{10} = 2.7139$ | $n_{d10} = 1.58313$ | $v_{d10} = 59.46$ |
| $r_{11} = -13.5685$ (aspherical) | | | |
| | $d_{11} = D\ 1\ 1$ | | |
| $r_{12} = -23.9637$ (aspherical) | | | |
| | $d_{12} = 2.5000$ | $n_{d12} = 1.52542$ | $v_{d12} = 55.78$ |
| $r_{13} = -22.2265$ | | | |
| | $d_{13} = 2.7767$ | | |
| $r_{14} = -11.9631$ | | | |
| | $d_{14} = 1.6000$ | $n_{d14} = 1.79952$ | $v_{d14} = 42.22$ |
| $r_{15} = -196.1132$ | | | |

Aspherical coefficients

Tenth surface $K = 0$
$A_4 = -1.0799 \times 10^{-4}$       $A_6 = -1.6005 \times 10^{-6}$       $A_8 = 3.4452 \times 10^{-8}$
$A_{10} = -3.9380 \times 10^{-10}$ Eleventh surface $K = 0$
$A_4 = 2.2203 \times 10^{-5}$       $A_6 = -5.8143 \times 10^{-7}$       $A_8 = 1.6619 \times 10^{-9}$
$A_{10} = 7.1387 \times 10^{-11}$ Twelfth surface $K = 0$
$A_4 = 8.8451 \times 10^{-5}$       $A_6 = -3.9424 \times 10^{-7}$       $A_8 = -3.8883 \times 10^{-9}$
$A_{10} = 3.1943 \times 10^{-11}$ Zoom data

| | Wide-angle | Middle | Telephoto |
|---|---|---|---|
| Focal length | 28.97 | 54.8 | 96.6 |
| F N O | 4.7 | 8.0 | 10.8 |
| D 4 | 4.74 | 10.58 | 16.47 |
| D 1 1 | 10.27 | 5.01 | 1.82 |

The configurations of individual lenses are the same as those of the first embodiment.

Figure 33A:
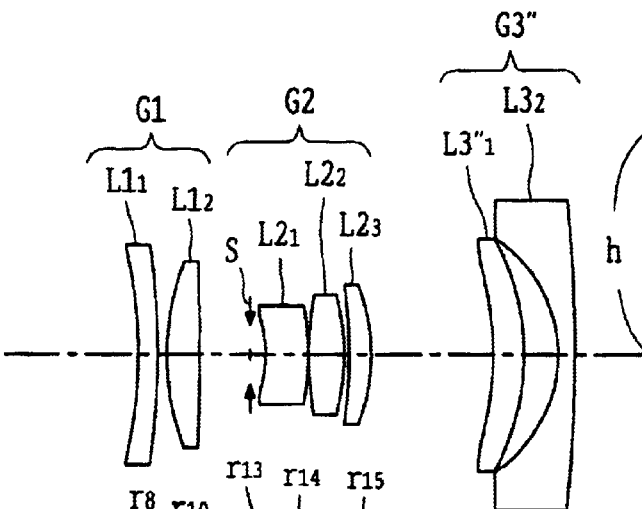
FIGS. 33A, 33B, and 33C are sectional views showing lens arrangements, developed along the optical axis, at wide-angle, middle, and telephoto positions, respectively, in a ninth embodiment of the three-lens-unit zoom optical system according to the present invention.
Figure 33B:
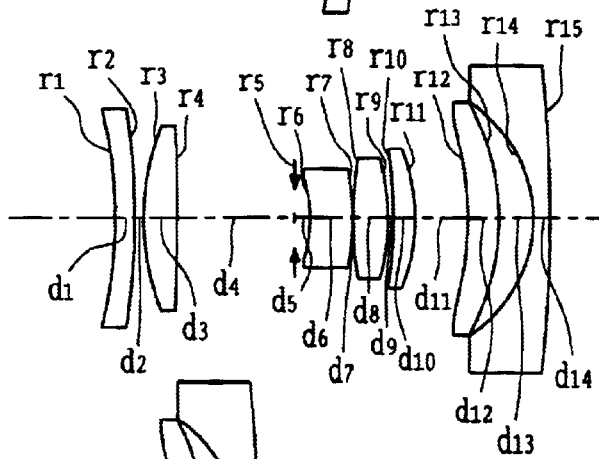
Figure 33C:
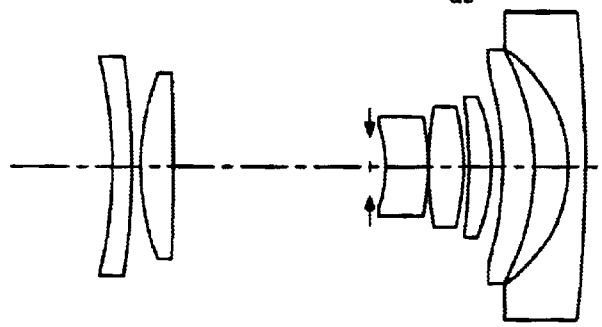

The eighth embodiment uses the zoom system that individual lens units are moved toward the object side so that when the magnification of the zoom optical system is changed, extending from the wide-angle position to the telephoto position, the space between the first lens unit G1 and the second lens unit G2" is widened and the space Ninth Embodiment FIGS. 33A–33C show lens arrangements in the ninth embodiment of the three-lens-unit zoom optical system according to present invention. FIGS. 34A–34D, 35A–35D, and 36A–36D show aberration characteristics in the ninth embodiment.

The three-lens-unit zoom optical system in the ninth embodiment, as in the seventh embodiment, comprises, in order from the object side, the first lens unit G1 with positive power, the stop S, the second lens unit G2 with positive power, and the third lens unit G3" with negative power.

The first lens unit G1 with positive power includes, in order from the object side, the first lens $L1_1$ with negative power and the second lens $L1_2$ with positive power.

The second lens unit G2 with positive power includes, in order from the object side, the first lens $L2_1$ with negative power, the second lens $L2_2$ with positive power, and the third lens $L2_3$ with positive power, having an aspherical surface on the object side.

The third lens unit G3" with negative power includes, in order form the object side, the first lens $L3_1$" with positive power, having aspherical surfaces on both sides, and the second lens $L3_2$ with negative power.

The configurations of individual lenses are the same as those of the first embodiment.

when the magnification of the zoom optical system is changed, extending from the wide-angle position to the telephoto position, the space between the first lens unit G1 and the second lens unit G2 is widened and the space between the second lens unit G2 and the third lens unit G3" is narrowed.

The stop S is moved integrally with the second lens unit G2.

Subsequently, lens data of optical members constituting the three-lens-unit zoom optical system of the ninth embodiment are listed below.

Numerical Data 9

| | | | |
|---|---|---|---|
| $r_1 = -34.4901$ | | | |
| | $d_1 = 1.6905$ | $n_{d1} = 1.84666$ | $v_{d1} = 23.78$ |
| $r_2 = -62.8039$ | | | |
| | $d_2 = 0.7166$ | | |
| $r_3 = 22.3757$ | | | |
| | $d_3 = 2.8629$ | $n_{d3} = 1.51633$ | $v_{d3} = 64.14$ |
| $r_4 = -129.3448$ | | | |
| | $d_4 = D\ 4$ | | |
| $r_5 = \infty$ (stop) | | | |
| | $d_5 = 1.3000$ | | |
| $r_6 = -11.6081$ | | | |
| | $d_6 = 3.6275$ | $n_{d6} = 1.74100$ | $v_{d6} = 52.64$ |
| $r_7 = -27.7487$ | | | |
| | $d_7 = 0.1000$ | | |
| $r_8 = 36.7975$ | | | |
| | $d_8 = 2.9192$ | $n_{d8} = 1.51633$ | $v_{d8} = 64.14$ |
| $r_9 = -21.8415$ | | | |
| | $d_9 = 0.3602$ | | |
| $r_{10} = -55.1703$ (aspherical) | | | |
| | $d_{10} = 1.9131$ | $n_{d10} = 1.58313$ | $v_{d10} = 59.46$ |
| $r_{11} = -14.9310$ | | | |
| | $d_{11} = D\ 1\ 1$ | | |
| $r_{12} = -25.8923$ (aspherical) | | | |
| | $d_{12} = 2.6158$ | $n_{d12} = 1.57530$ | $v_{d12} = 33.47$ |
| $r_{13} = -22.5722$ (aspherical) | | | |
| | $d_{13} = 2.8194$ | | |
| $r_{14} = -11.8128$ | | | |
| | $d_{14} = 1.4379$ | $n_{d14} = 1.79952$ | $v_{d14} = 42.22$ |
| $r_{15} = -158.1700$ | | | |

| Aspherical coefficients |
|---|

Tenth surface $K = 0$
$A_4 = -1.0208 \times 10^{-4}$    $A_6 = 1.1125 \times 10^{-6}$    $A_8 = -4.9781 \times 10^{-8}$
$A_{10} = 8.1420 \times 10^{-10}$
Twelfth surface $K = 0$
$A_4 = 6.8458 \times 10^{-5}$    $A_6 = -9.4152 \times 10^{-7}$    $A_8 = 1.4932 \times 10^{-8}$
$A_{10} = -2.8325 \times 10^{-11}$
Thirteenth surface $K = 0$
$A_4 = -1.5250 \times 10^{-5}$    $A_6 = -9.5320 \times 10^{-7}$    $A_8 = 8.6745 \times 10^{-9}$

| Zoom data | | | |
|---|---|---|---|
| | Wide-angle | Middle | Telephoto |
| Focal length | 28.97 | 54.8 | 96.6 |
| F N O | 5.8 | 8.0 | 12.0 |
| D 4 | 4.23 | 10.14 | 17.02 |
| D 1 1 | 10.09 | 4.56 | 1.13 |

The ninth embodiment uses the zoom system that individual lens units are moved toward the object side so that Subsequently, the values of the conditions in individual embodiments are listed in Tables 1 and 2.

TABLE 1

|  | \|f3\|/h | f3/f31 | fw/h | fw/f1 | \|r211\|/f2 | $D_{G2}/f2$ |
|---|---|---|---|---|---|---|
| 1st embodiment | 0.75 | −0.025 | 1.341 | 0.48 | 0.5 | 0.38 |
| 2nd embodiment | 0.74 | −0.03 | 1.34 | 0.49 | 0.51 | 0.39 |
| 3rd embodiment | 0.75 | −0.041 | 1.32 | 0.49 | 0.51 | 0.39 |
| 4th embodiment | 0.75 | −0.041 | 1.34 | 0.49 | 0.51 | 0.39 |
| 5th embodiment | 0.71 | 0.02 | 1.34 | 0.45 | 0.62 | 0.44 |
| 6th embodiment | 0.68 | 0.067 | 1.33 | 0.44 | 0.64 | 0.46 |
| 7th embodiment | 0.74 | −0.032 | 1.34 | 0.49 | 0.5 | 0.38 |
| 8th embodiment | 0.75 | −0.041 | 1.34 | 0.49 | 0.51 | 0.39 |
| 9th embodiment | 0.77 | −0.07 | 1.34 | 0.49 | 0.5 | 0.38 |

TABLE 2

|  | f1 | f2 | f3 | f31 | fw | h | r211 | $D_{G2}$ |
|---|---|---|---|---|---|---|---|---|
| 1st embodiment | 59.5721 | 22.9739 | −16.2555 | 636.305 | 28.9698 | 21.6 | −11.6219 | 8.888 |
| 2nd embodiment | 58.24 | 22.5416 | −15.9923 | 526.794 | 28.9676 | 21.6 | −11.4998 | 8.92 |
| 3rd embodiment | 58.3697 | 22.3725 | −16.2 | 390.988 | 28.5061 | 21.6 | −11.5267 | 8.8912 |
| 4th embodiment | 58.3703 | 22.3638 | −16.1867 | 390.583 | 28.9704 | 21.6 | −11.5273 | 8.9 |
| 5th embodiment | 63.991 | 20.7835 | −15.3456 | −743.402 | 28.976 | 21.6 | −13.03 | 9.2243 |
| 6th embodiment | 64.2888 | 20.1868 | −14.8318 | −218.666 | 28.8649 | 21.6 | −13.04 | 9.3128 |
| 7th embodiment | 59.1555 | 22.5688 | −16.1245 | 504.457 | 29.0412 | 21.6 | −11.4783 | 8.7768 |
| 8th embodiment | 58.378 | 22.3696 | −16.1916 | 390.152 | 28.97 | 21.6 | −11.5278 | 8.8863 |
| 9th embodiment | 58.7461 | 23.0551 | −16.7439 | 237.615 | 28.9696 | 21.6 | −11.6081 | 8.92 |

Figure 37:
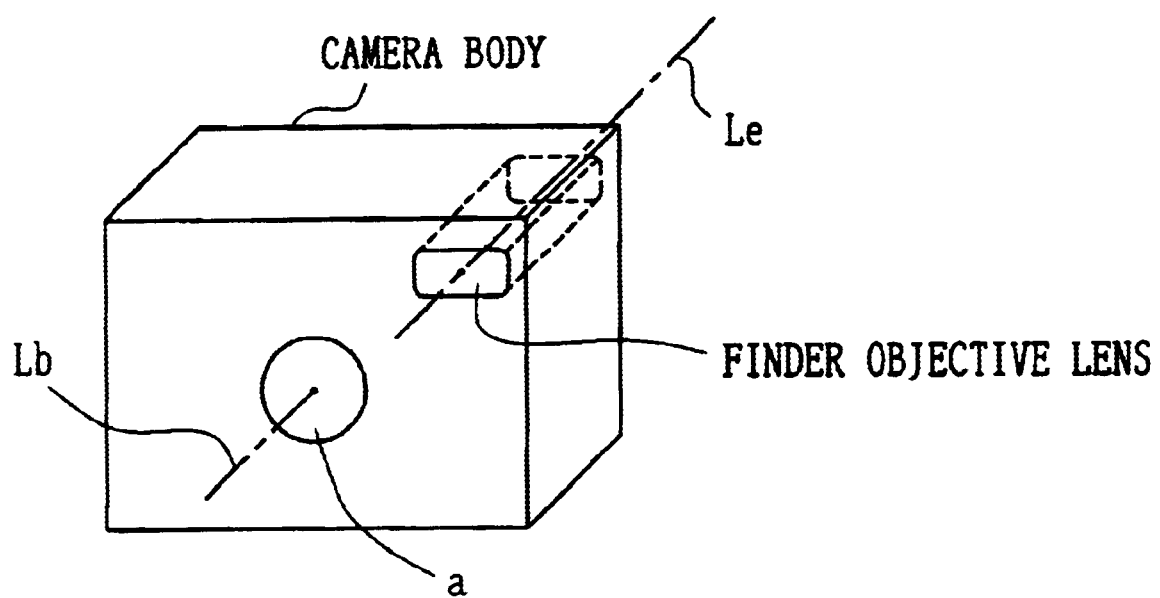
FIG. 37 is a perspective view schematically showing an example of a camera using the three-lens-unit zoom optical system of the present invention.
Figure 38:
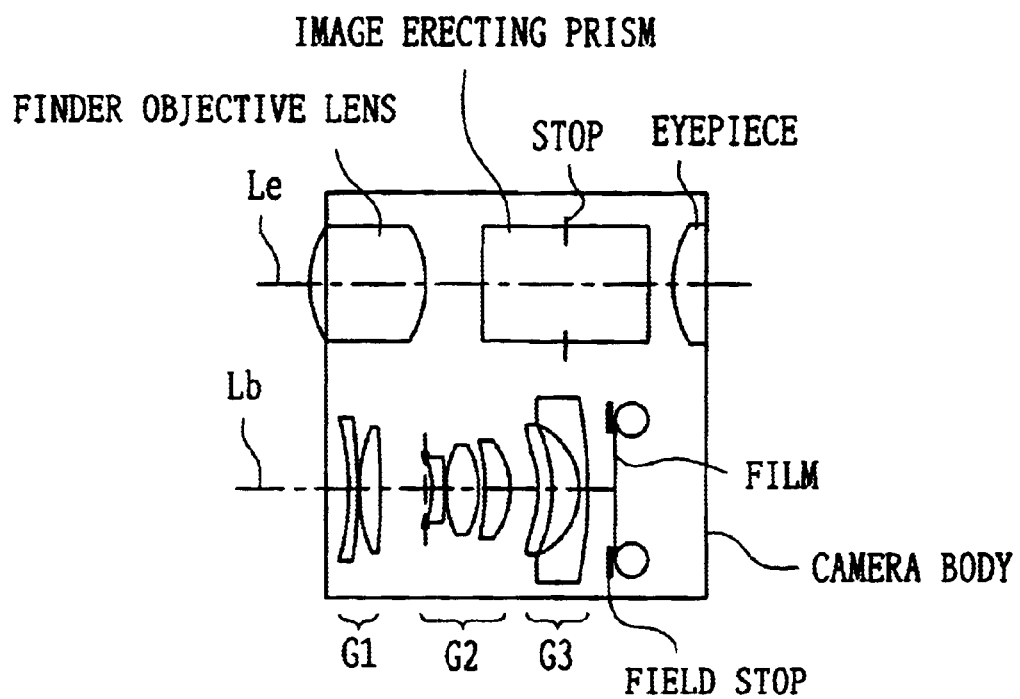
FIG. 38 is a sectional view schematically showing the interior of the camera of FIG. 37.
Figure 39:
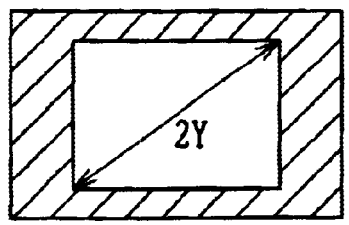
FIG. 39 is an explanatory view showing the diagonal length of the frame of the camera of FIG. 38.

The three-lens-unit zoom optical system of the present invention described above is used as a photographing objective lens a for compact cameras. FIGS. 37 and 38 shows a compact camera provided with the three-lens-unit zoom optical system of the present invention. In FIG. 38, again G1 represents the first lens unit with positive refracting power, G2 represents the second lens unit with positive refracting power, and G3 represents the third lens unit with negative refracting power. The three-lens-unit zoom optical system of the present invention mentioned in the above embodiments is constructed with the first lens unit G1, the second lens unit G2, and the third lens unit G3. Reference symbol Lb denotes a photographing optical path and Le denotes a finder optical path. The photographing optical path Lb and the finder optical path Le are arranged in parallel. An image of an object is observed through a finder including a finder objective lens, an image erecting prism, a stop, and an eyepiece. The image is formed on a film by the photographing objective lens a. Here, a field stop which has a rectangular aperture defining a photographic area, such as that shown in FIG. 39, is placed immediately before the film. The diagonal length of the field stop is designated by 2Y.

As the photographing objective lens of an electronic camera using an electronic image sensor, such as a CCD, instead of the film, the three-lens-unit zoom optical system of the present invention can be used. In this case, a positive lens may be placed immediately before the image plane of the electronic image sensor so that axial and off-axis principal rays incident on the electronic image sensor are nearly perpendicular thereto.

In this case, the diagonal length of the maximum effective photographic area of the electronic image sensor is 2Y.

What is claimed is:

1. A three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said second lens unit comprises a negative lens element and two positive lens elements, and said third lens unit consists of, in order from said object side, a lens component with an aspherical surface and a negative lens component, satisfying the following conditions:

$$0.5<|f3|/h<0.8$$

$$-0.2<f3/f31<0.2$$

where f3 is a focal length of said third lens unit, h is a maximum image height, and f31 is a focal length of said lens component with an aspherical surface in said third lens unit.

2. A three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a plastic lens component with an aspherical surface and a negative lens component, satisfying the following condition:

$$0.5<|f3|/h<0.8$$

where f3 is a focal length of said third lens unit and h is a maximum image height.

3. A three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said second lens unit consists, in order from said object side, of a negative lens element, a positive lens element, and a positive lens element, and said third lens unit consists of, in order from said object side, a lens component with an aspherical surface and a negative lens component, satisfying the following conditions:

$$1.2 < fw/h < 1.6$$

$$-0.2 < f3/f31 < 0.2$$

where fw is a focal length at said wide-angle position, h is a maximum image height, f3 is a focal length of said third lens unit, and f31 is a focal length of said lens component with an aspherical surface in said third lens unit.

4. A three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a lens component with an aspherical surface and a negative lens component, satisfying the following conditions:

$$0.5 < |f3|/h < 0.8$$

$$-0.2 < f3/f31 < 0.2$$

$$0.3 < fw/f1 < 0.6$$

where f3 is a focal length of said third lens unit, h is a maximum image height, f31 is a focal length of said lens component with an aspherical surface in said third lens unit, fw is a focal length at said wide-angle position, and f1 is a focal length of said first lens unit.

5. A three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a lens component with an aspherical surface and a negative lens component, satisfying the following conditions:

$$0.5 < |f3|/h < 0.8$$

$$-0.2 < f3/f31 < 0.2$$

$$0.3 < D_{G2}/f2 < 0.6$$

where f3 is a focal length of said third lens unit, h is a maximum image height, f31 is a focal length of said lens component with an aspherical surface in said third lens unit, $D_{G2}$ is a distance along an optical axis from a most object-side surface of said second lens unit to a most image-side surface thereof, and f2 is a focal length of said second lens unit.

6. A three-lens-unit zoom optical system according to claim 1, further satisfying the following condition:

$$1.2 < fw/h < 1.6$$

where fw is a focal length at said wide-angle position.

7. A three-lens-unit zoom optical system according to claim 1, wherein said lens component with an aspherical surface in said third lens unit is constructed of plastic.

8. A three-lens-unit zoom optical system according to claim 1, wherein said second lens unit consists, in order from said object side, of a negative lens element, a positive lens element, and a positive lens element.

9. A three-lens-unit zoom optical system according to claim 1, further satisfying the following condition:

$$0.3 < fw/f1 < 0.6$$

where fw is a focal length at said wide-angle position and f1 is a focal length of said first lens unit.

10. A three-lens-unit zoom optical system according to claim 1, wherein said negative lens element directing a concave surface toward said object side is located at a most object-side position of said second lens unit to satisfy the following condition:

$$0.4 < |r_{211}|/f2 < 0.8$$

where $r_{211}$ is a radius of curvature of an object-side surface of said negative lens element and f2 is a focal length of said second lens unit.

11. A three-lens-unit zoom optical system according to claim 1, further satisfying the following condition:

$$0.3 < D_{G2}/f2 < 0.6$$

where $D_{G2}$ is a distance along an optical axis from a most object-side surface of said second lens unit to a most image-side surface thereof and f2 is a focal length of said second lens unit.

12. A three-lens-unit zoom optical system according to claim 1, wherein a negative meniscus lens directing a concave surface toward said object side is located at a most object-side position of said first lens unit.

13. A three-lens-unit zoom optical system according to claim 12, wherein said negative meniscus lens is a single lens component.

14. A three-lens-unit zoom optical system according to claim 1, wherein each of lenses constituting said three-lens-unit zoom optical system is a single lens.

15. A three-lens-unit zoom optical system according to claim 2, further satisfying the following condition:

$$1.2 < fw/h < 1.6$$

where fw is a focal length at said wide-angle position.

16. A three-lens-unit zoom optical system according to claim 2, wherein said second lens unit consists, in order from said object side, of a negative lens element, a positive lens element, and a positive lens element.

17. A three-lens-unit zoom optical system according to claim 2, further satisfying the following condition:

$$0.3 < fw/f1 < 0.6$$

where fw is a focal length at said wide-angle position and f1 is a focal length of said first lens unit.

18. A three-lens-unit zoom optical system according to claim 2, wherein said negative lens element directing a concave surface toward said object side is located at a most object-side position of said second lens unit to satisfy the following condition:

$$0.4 < |r_{211}|/f2 < 0.8$$

where $r_{211}$ is a radius of curvature of an object-side surface of said negative lens element and f2 is a focal length of said second lens unit.

19. A three-lens-unit zoom optical system according to claim 2, further satisfying the following condition:

$$0.3 < D_{G2}/f2 < 0.6$$

where $D_{G2}$ is a distance along an optical axis from a most object-side surface of said second lens unit to a most image-side surface thereof and f2 is a focal length of said second lens unit.

20. A three-lens-unit zoom optical system according to claim 2, wherein a negative meniscus lens directing a concave surface toward said object side is located at a most object-side position of said first lens unit.

21. A three-lens-unit zoom optical system according to claim 20, wherein said negative meniscus lens is a single lens component.

22. A three-lens-unit zoom optical system according to claim 2, wherein each of lenses constituting said three-lens-unit zoom optical system is a single lens.

23. A three-lens-unit zoom optical system according to claim 3, wherein said lens component with an aspherical surface in said third lens unit is constructed of plastic.

24. A three-lens-unit zoom optical system according to claim 3, further satisfying the following condition:

$$0.5 < |f3|/h < 0.8$$

25. A three-lens-unit zoom optical system according to claim 3, further satisfying the following condition:

$$0.3 < fw/f1 < 0.6$$

where f1 is a focal length of said first lens unit.

26. A three-lens-unit zoom optical system according to claim 3, wherein said negative lens element directing a concave surface toward said object side is located at a most object-side position of said second lens unit to satisfy the following condition:

$$0.4 < r_{211}|/f2 < 0.8$$

where $r_{211}$ is a radius of curvature of an object-side surface of said negative lens element and f2 is a focal length of said second lens unit.

27. A three-lens-unit zoom optical system according to claim 3, further satisfying the following condition:

$$0.3 < D_{G2}/f2 < 0.6$$

where $D_{G2}$ is a distance along an optical axis from a most object-side surface of said second lens unit to a most image-side surface thereof and f2 is a focal length of said second lens unit.

28. A three-lens-unit zoom optical system according to claim 3, wherein a negative meniscus lens directing a concave surface toward said object side is located at a most object-side position of said first lens unit.

29. A three-lens-unit zoom optical system according to claim 28, wherein said negative meniscus lens is a single lens component.

30. A three-lens-unit zoom optical system according to claim 3, wherein each of lenses constituting said three-lens-unit zoom optical system is a single lens.

31. A three-lens-unit zoom optical system according to claim 4, further satisfying the following condition:

$$1.2 < fw/h < 1.6$$

32. A three-lens-unit zoom optical system according to claim 4, wherein said lens component with an aspherical surface in said third lens unit is constructed of plastic.

33. A three-lens-unit zoom optical system according to claim 4, wherein said second lens unit consists, in order from said object side, of a negative lens element, a positive lens element, and a positive lens element.

34. A three-lens-unit zoom optical system according to claim 4, wherein said negative lens element directing a concave surface toward said object side is located at a most object-side position of said second lens unit to satisfy the following condition:

$$0.4 < |r_{211}|/f2 < 0.8$$

where $r_{211}$ is a radius of curvature of an object-side surface of said negative lens element and f2 is a focal length of said second lens unit.

35. A three-lens-unit zoom optical system according to claim 4, further satisfying the following condition:

$$0.3 < D_{G2}/f2 < 0.6$$

where $D_{G2}$ is a distance along an optical axis from a most object-side surface of said second lens unit to a most image-side surface thereof and f2 is a focal length of said second lens unit.

36. A three-lens-unit zoom optical system according to claim 4, wherein a negative meniscus lens directing a concave surface toward said object side is located at a most object-side position of said first lens unit.

37. A three-lens-unit zoom optical system according to claim 36, wherein said negative meniscus lens is a single lens component.

38. A three-lens-unit zoom optical system according to claim 4, wherein each of lenses constituting said three-lens-unit zoom optical system is a single lens.

39. A three-lens-unit zoom optical system according to claim 5, further satisfying the following condition:

$$1.2 < fw/h < 1.6$$

where fw is a focal length at said wide-angle position.

40. A three-lens-unit zoom optical system according to claim 5, wherein said lens component with an aspherical surface in said third lens unit is constructed of plastic.

41. A three-lens-unit zoom optical system according to claim 5, wherein said second lens unit consists, in order from said object side, of a negative lens element, a positive lens element, and a positive lens element.

42. A three-lens-unit zoom optical system according to claim 5, wherein said negative lens element directing a concave surface toward said object side is located at a most object-side position of said second lens unit to satisfy the following condition:

$$0.4 < |r_{211}|/f2 < 0.8$$

where $r_{211}$ is a radius of curvature of an object-side surface of said negative lens element.

43. A three-lens-unit zoom optical system according to claim 5, wherein a negative meniscus lens directing a concave surface toward said object side is located at a most object-side position of said first lens unit.

44. A three-lens-unit zoom optical system according to claim 43, wherein said negative meniscus lens is a single lens component.

45. A three-lens-unit zoom optical system according to claim 5, wherein each of lenses constituting said three-lens-unit zoom optical system is a single lens.

46. A camera provided with a three-lens-unit zoom optical system, said three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said second lens unit comprises a negative lens element and two positive lens elements, and said third lens unit consists of, in order from said object side, a lens component with an aspherical surface and a negative lens component, satisfying the following conditions:

$0.5 < |f3|/h < 0.8$ $-0.2 < f3/f31 < 0.2$ where f3 is a focal length of said third lens unit, h is a maximum image height, and f31 is a focal length of said lens component with an aspherical surface in said third lens unit.

47. A camera provided with a three-lens-unit zoom optical system, said three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a plastic lens component with an aspherical surface and a negative lens component, satisfying the following condition:

$0.5 < |f3|/h < 0.8$ where f3 is a focal length of said third lens unit and h is a maximum image height.

48. A camera provided with a three-lens-unit zoom optical system, said three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said second lens unit consists, in order from said object side, of a negative lens element, a positive lens element, and a positive lens element, and said third lens unit consists of, in order from said object side, a lens component with an aspherical surface and a negative lens component, satisfying the following conditions:

$1.2 < fw/h < 1.6$ $-0.2 < f3/f31 < 0.2$ where fw is a focal length at said wide-angle position, h is a maximum image height, f3 is a focal length of said third lens unit, and f31 is a focal length of said lens component with an aspherical surface in said third lens unit.

49. A camera provided with a three-lens-unit zoom optical system, said three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a lens component with an aspherical surface and a negative lens component, satisfying the following conditions:

$0.5 < |f3|/h < 0.8$ $-0.2 < f3/f31 < 0.2$ $0.3 < fw/f1 < 0.6$ where f3 is a focal length of said third lens unit, h is a maximum image height, f31 is a focal length of said lens component with an aspherical surface in said third lens unit, fw is a focal length at said wide-angle position, and f1 is a focal length of said first lens unit.

50. A camera provided with a three-lens-unit zoom optical system, said three-lens-unit zoom optical system comprising: in order from an object side, a first lens unit with positive refracting power;

a second lens unit with positive refracting power; and a third lens unit with negative refracting power, individual lens units being moved toward said object side so that when a magnification of said zoom optical system is changed, extending from a wide-angle position to a telephoto position, a space between said first lens unit and said second lens unit is widened and a space between said second lens unit and said third lens unit is narrowed, wherein said third lens unit consists of, in order from said object side, a lens component with an aspherical surface and a negative lens component, satisfying the following conditions:

$$0.5 < |f3|/h < 0.8$$

$$-0.2 < f3/f31 < 0.2$$

$$0.3 < D_{G2}/f2 < 0.6$$

where f3 is a focal length of said third lens unit, h is a maximum image height, f31 is a focal length of said lens component with an aspherical surface in said third lens unit, $D_{G2}$ is a distance along an optical axis from a most object-side surface of said second lens unit to a most image-side surface thereof, and f2 is a focal length of said second lens unit.

* * * * *